(12) United States Patent
Sasaki et al.

(10) Patent No.: US 7,417,825 B2
(45) Date of Patent: Aug. 26, 2008

(54) THIN FILM MAGNETIC HEAD STRUCTURE, ADAPTED TO MANUFACTURE A THIN FILM MAGNETIC HEAD

(75) Inventors: Yoshitaka Sasaki, Santa Clara, CA (US); Hironori Araki, Milpitas, CA (US); Shigeki Tanemura, Santa Clara, CA (US); Hiroyuki Ito, Sunnyvale, CA (US); Lijie Guan, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 365 days.

(21) Appl. No.: 10/985,890

(22) Filed: Nov. 12, 2004

(65) Prior Publication Data

US 2006/0103979 A1 May 18, 2006

(51) Int. Cl.
*G11B 5/147* (2006.01)
(52) U.S. Cl. .................................. 360/125.07
(58) Field of Classification Search ............... 360/126, 360/125, 123.04, 125.06, 125.07, 125.14, 360/125.1
See application file for complete search history.

(56) References Cited

U.S. PATENT DOCUMENTS 4,656,546 A    4/1987  Mallory ..................... 360/110
4,672,493 A    6/1987  Schewe ...................... 360/125
6,259,585 B1 * 7/2001  Sasaki et al. ................ 360/317
6,504,675 B1   1/2003  Shukh et al. ................ 360/125
6,612,017 B2 * 9/2003  Santini ..................... 29/603.12
2002/0093763 A1 * 7/2002  Sato et al. ................... 360/126
2002/0163758 A1 * 11/2002 Shinjo ....................... 360/126
2004/0257702 A1 * 12/2004 Kimura et al. ............... 360/126
2005/0047012 A1 * 3/2005  Lille et al. .................. 360/126

FOREIGN PATENT DOCUMENTS

JP    A-2003-203311    7/2003
JP    A-2003-242607    8/2003
JP    A-2004-094997    3/2004

* cited by examiner

*Primary Examiner*—Julie Anne Watko
(74) *Attorney, Agent, or Firm*—Oliff & Berridge, PLC

(57) ABSTRACT

A thin-film magnetic head structure has a configuration adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated. The main magnetic pole layer has an end face joint structure where respective end faces of the magnetic pole end part and a yoke magnetic pole part having a size greater than that of the magnetic pole end part are joined to each other, and a surface with a flat surface on a side closer to the thin-film coil.

12 Claims, 27 Drawing Sheets

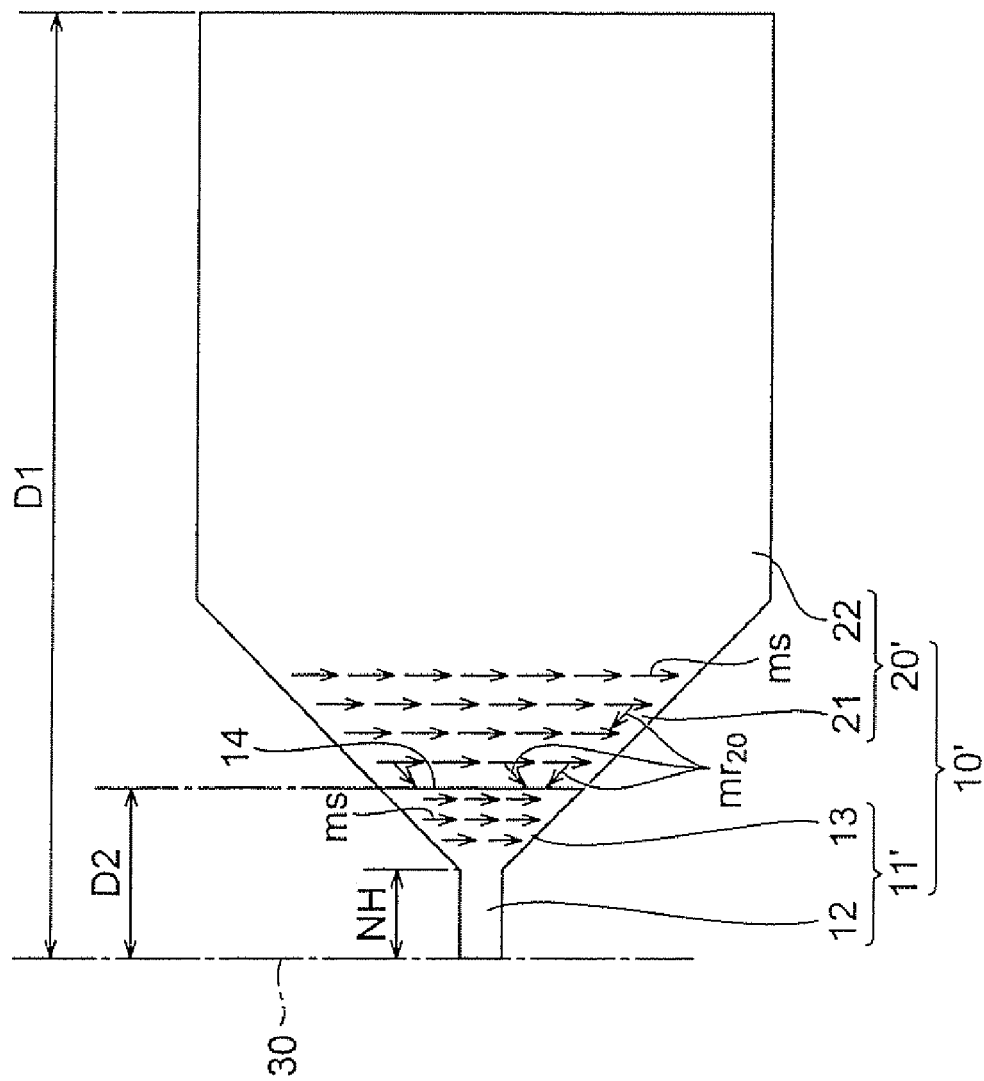

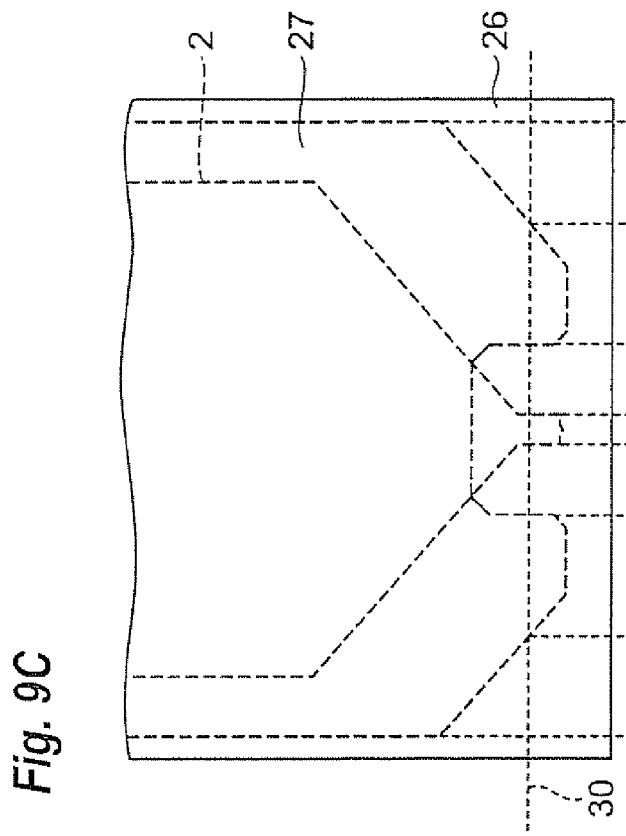
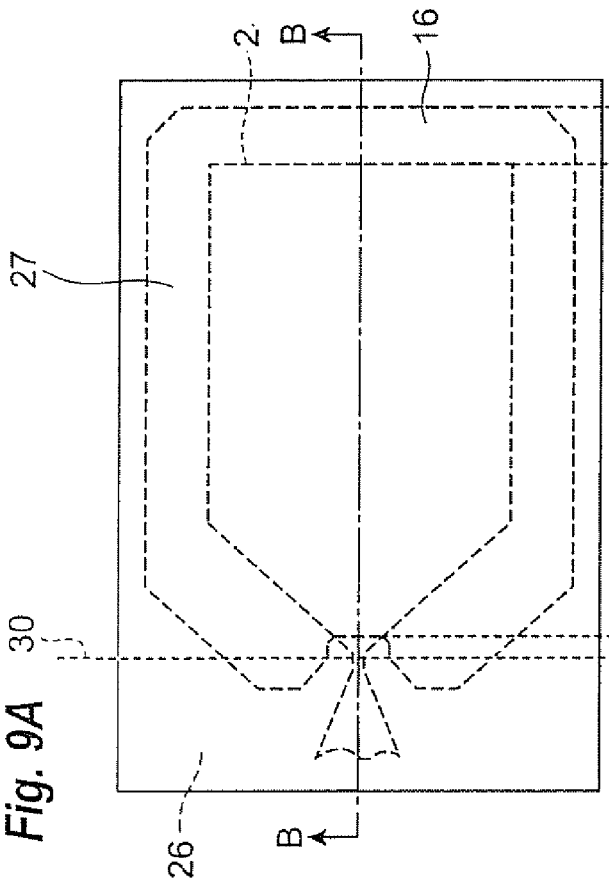
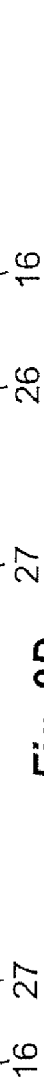
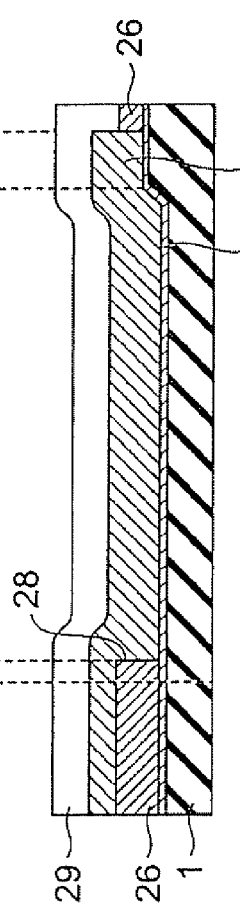

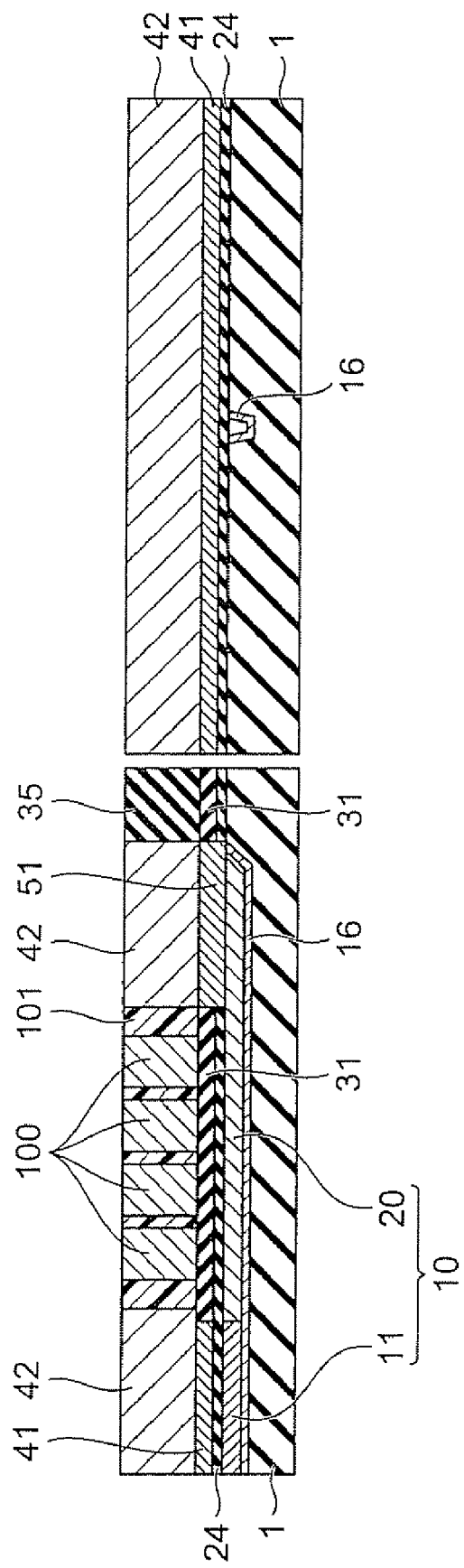

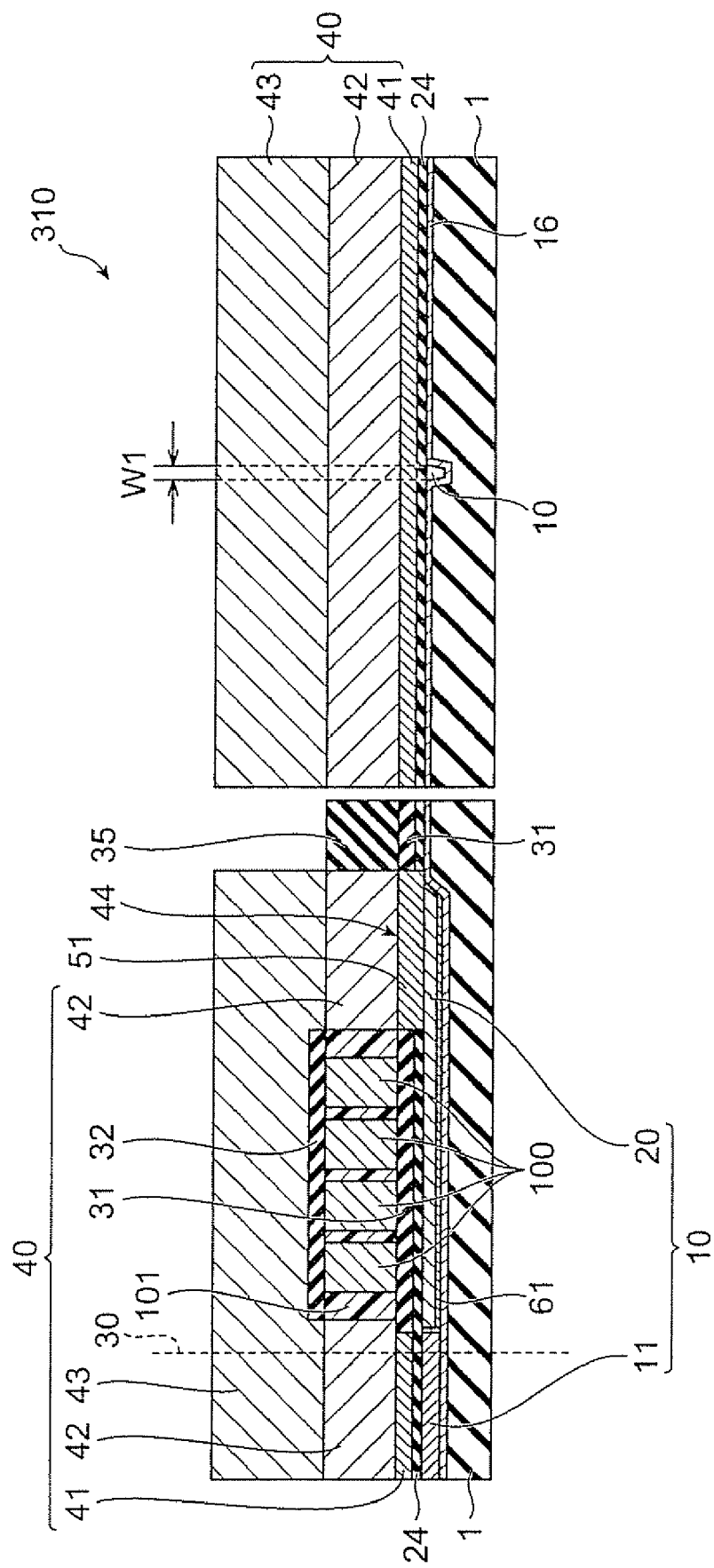

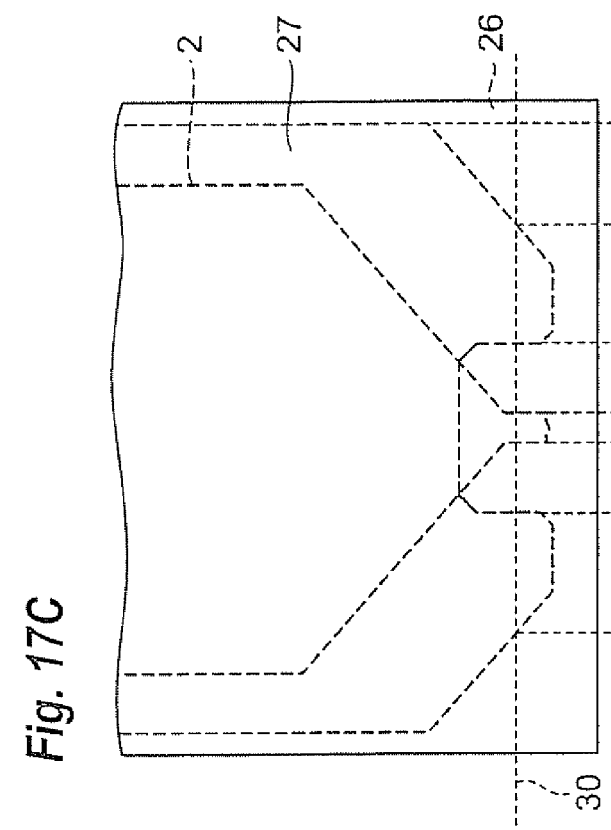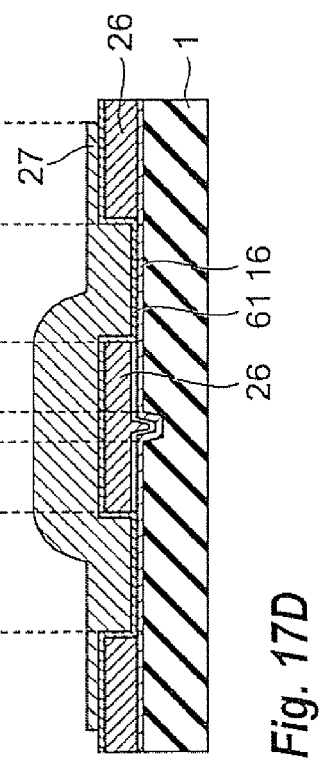
Fig. 17A
Fig. 17B
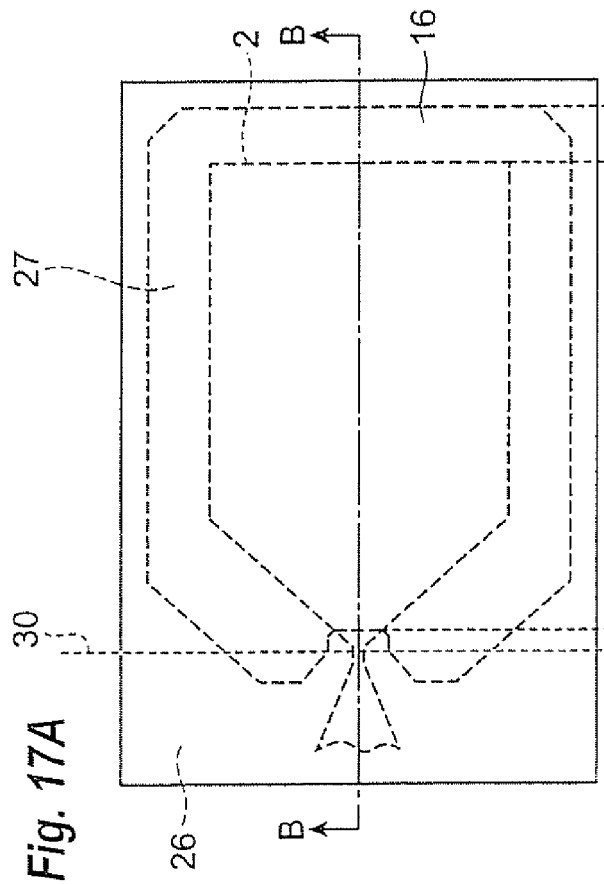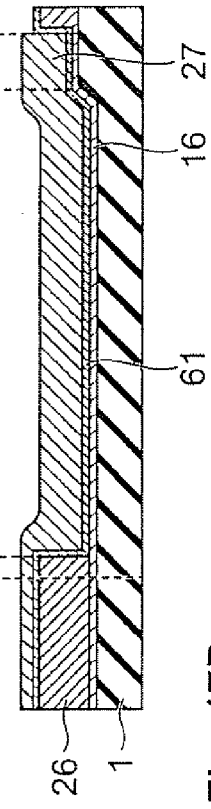
Fig. 17C
Fig. 17D

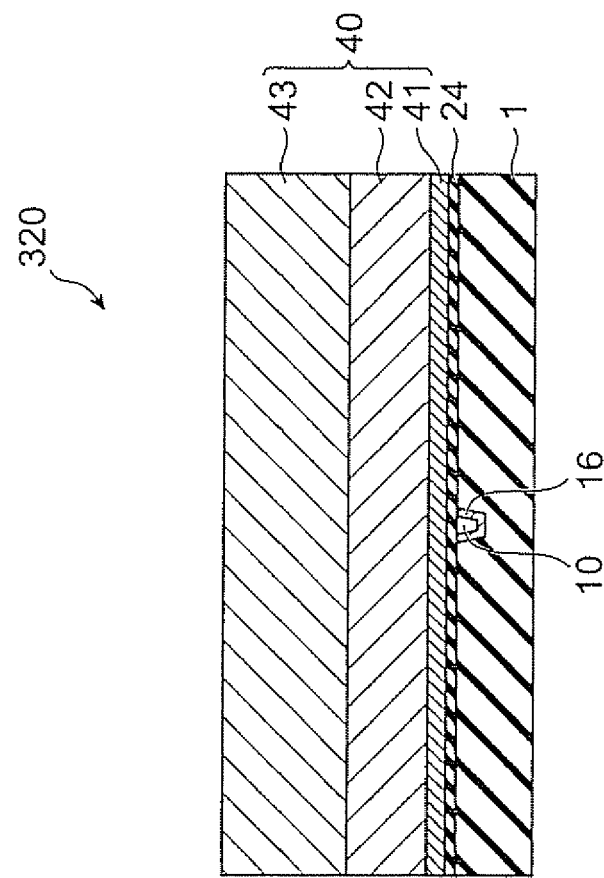
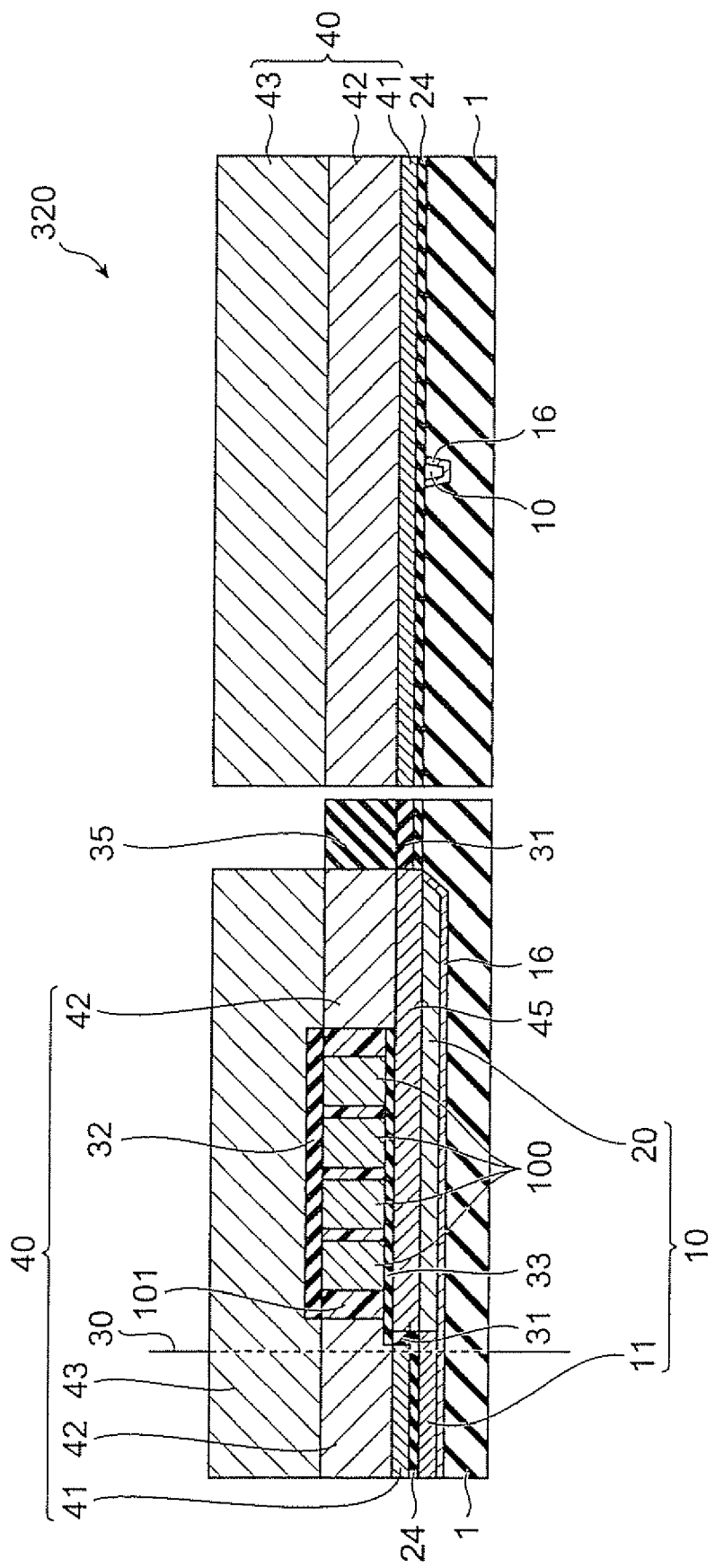
Fig. 21A
Fig. 21B

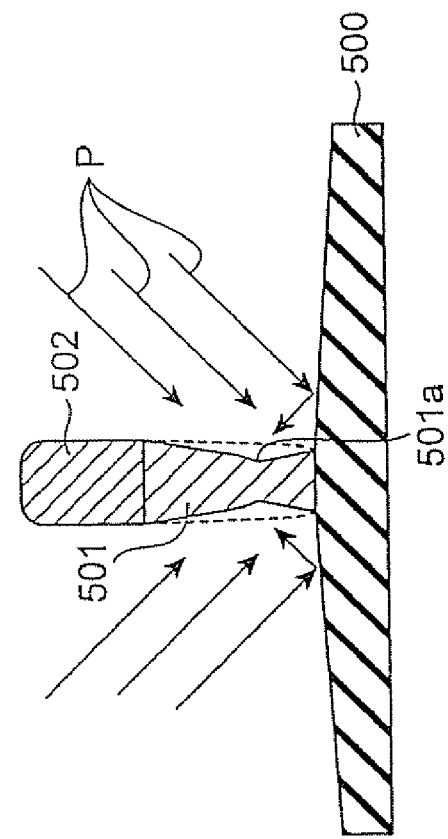
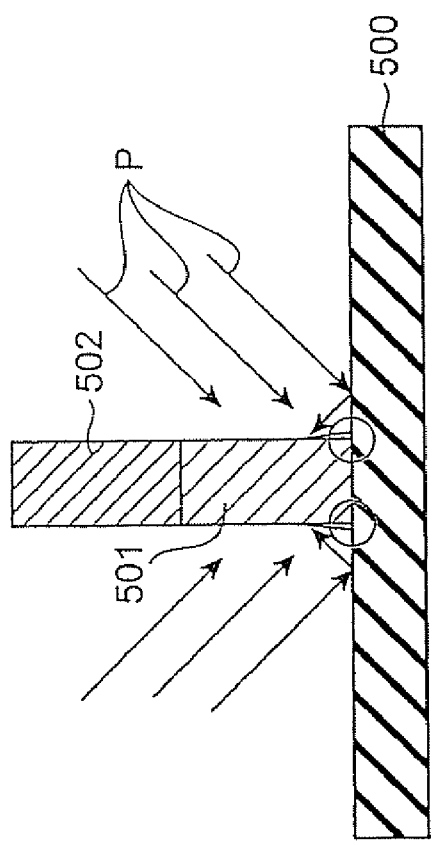
Fig. 23B
Fig. 23A
PRIOR ART

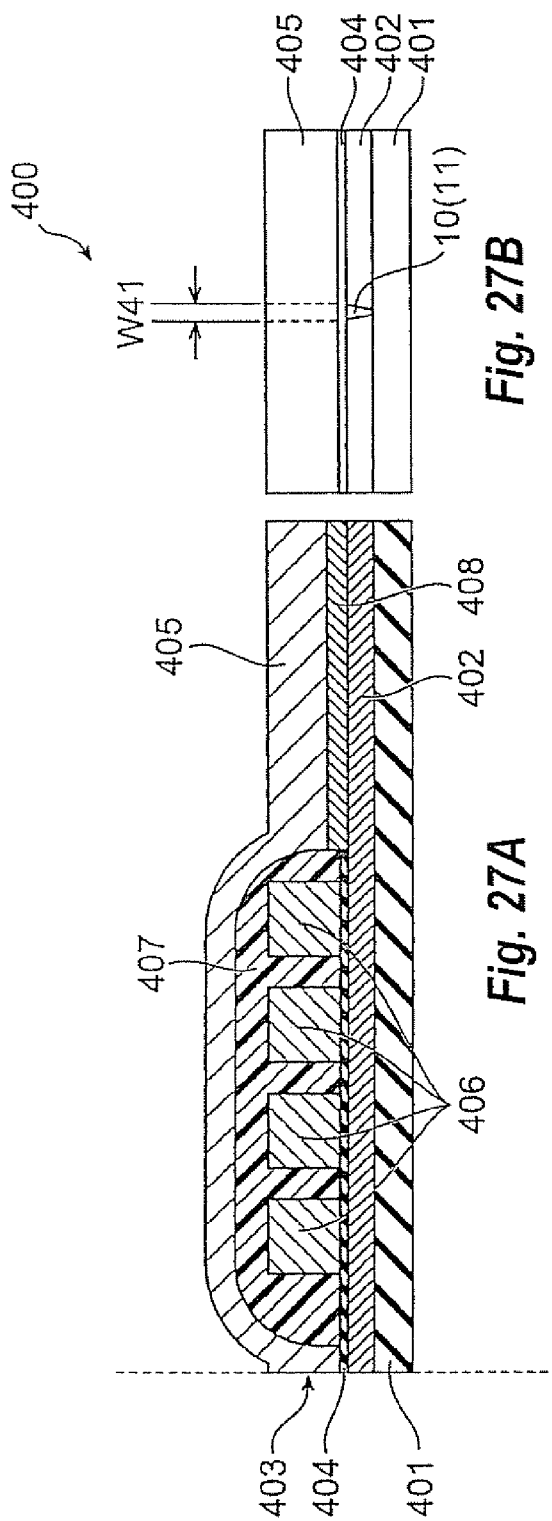
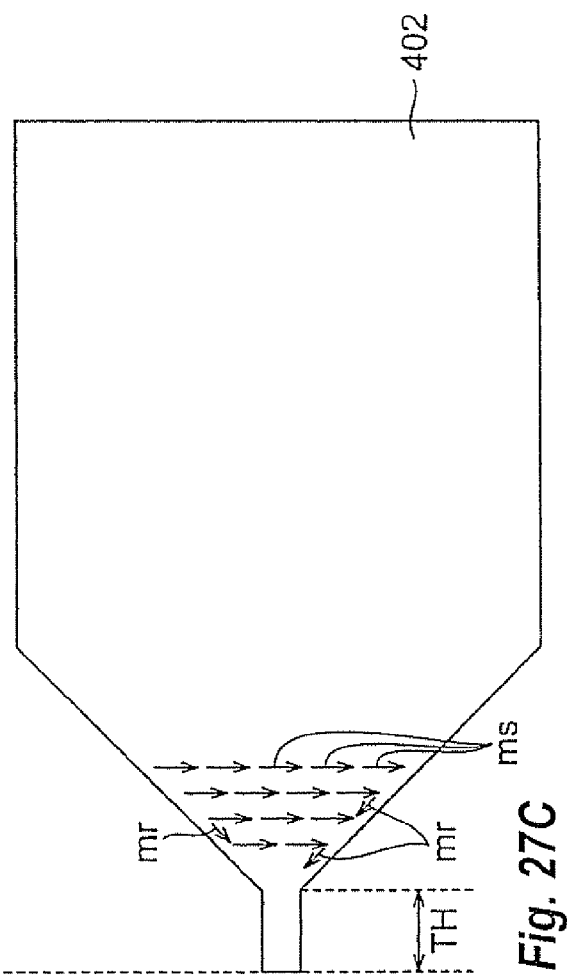
Fig. 27A
Fig. 27B
Fig. 27C
PRIOR ART

THIN FILM MAGNETIC HEAD STRUCTURE, ADAPTED TO MANUFACTURE A THIN FILM MAGNETIC HEAD

BACKGROUND

1. Field of the Invention

The present invention relates to a thin-film magnetic head structure for manufacturing a thin-film magnetic head which performs magnetic recording operations by perpendicular recording, a method of manufacturing the same, and a thin-film magnetic head.

2. Related Background Art

In recent years, the areal density in hard disk drives has been increasing remarkably. Recently, the areal density in hard disk drives has reached 160 to 200 GB/platter in particular, and is about to increase further. Accordingly, thin-film magnetic heads have been required to improve their performances.

In terms of recording schemes, thin-film magnetic heads can roughly be divided into those for longitudinal recording in which information is recorded in a (longitudinal) direction of a recording surface of a hard disk (recording medium) and those for perpendicular recording in which data is recorded while the direction of recording magnetization formed in the hard disk is perpendicular to the recording surface. As compared with the thin-film magnetic heads for longitudinal recording, the thin-film magnetic heads for perpendicular recording have been considered more hopeful, since they can realize a much higher recording density while their recorded hard disks are less susceptible to thermal fluctuations.

Conventional thin-film magnetic heads for perpendicular recording are disclosed, for example, in U.S. Pat. No. 6,504,675, U.S. Pat. No. 4,656,546, U.S. Pat. No. 4,672,493, and Japanese Patent Application Laid-Open No. 2004-94997.

Meanwhile, when thin-film magnetic heads for perpendicular recording record data onto areas in inner and outer peripheries of a hard disk, a magnetic pole end part disposed on the side of a medium-opposing surface (also referred to as air bearing surface, ABS) opposing the recording medium (hard disk) yields a certain skew angle with respect to a data recording track. In perpendicular magnetic recording heads (hereinafter also referred to as "PMR") having a high writing capability, the skew angle has caused a problem of so-called side fringe in which unnecessary data are recorded between adjacent tracks. The side fringe adversely affects the detection of servo signals and the S/N ratio of reproduced waveforms. Therefore, in conventional PMRs, the magnetic pole end part on the ABS side in the main magnetic pole layer has a bevel form gradually narrowing in width toward one direction (see, for example, Japanese Patent Application Laid-Open Nos. 2003-242607 and 2003-203311 in this regard).

SUMMARY

However, the conventional PMRs have been problematic in that they cause a phenomenon known as pole erasure by which data recorded beforehand on a hard disk is erased when information is further recorded at a high density. The pole erasure is a phenomenon in which, after data is written on a recording medium (hard disk) having a high maximum coercivity Hc, a leakage magnetic flux flows from the ABS to the hard disk even when no write current flows through a thin-film coil, thereby erasing the other data.

This point will be explained in further detail.

An example of the conventional PMRs is a thin-film magnetic head 400 having a structure shown in FIGS. 27A, 27B and 27C. This thin-film magnetic head 400 includes a main magnetic pole layer 402 which is formed on an insulating layer 401 and has a bevel-shaped magnetic pole end part disposed on the side of an ABS 403; a write shield layer 405 which is magnetically connected to the main magnetic pole layer 402 and opposes the main magnetic pole layer 402 by way of a recording gap layer 404 on the ABS 403 side; and a thin-film coil 406. The thin-film coil 406 is wound in a planar spiral about a junction 408 connecting the main magnetic pole layer 402 and the write shield layer 405, while its windings are insulated from each other by a photoresist 407.

In the conventional PMRs, as in the thin-film magnetic head 400, a magnetic material is magnetized such that the direction of magnetization ms is oriented so as to extend along the ABS 403, whereby the main magnetic pole layer 402 is formed.

In the conventional PMRs such as the thin-film magnetic head 400, however, even when the direction of magnetization ms is oriented so as to extend along the ABS 403, the direction of remnant magnetization mr inside the main magnetic pole layer 402 after completion of writing is oriented toward the ABS 403 side and thus faces a different direction than the magnetization ms. (The direction different from that extending along the ABS will be referred to as "different direction" in the following.) Therefore, when such a PMR writes data, leakage magnetic fluxes due to the remnant magnetization mr may erase data already written on a hard disk or weaken signals of written data even though no write current is flowing.

In order to overcome the problem mentioned above, it is an object of the present invention to provide a thin-film magnetic head structure which can manufacture a thin-film magnetic head comprising a structure capable of preventing the pole erasure from occurring while improving the recording density, a method of manufacturing the same, and a thin-film magnetic head.

For solving the above-mentioned problem, in one aspect, the present invention provides a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil would about the write shield layer or main magnetic pole layer are laminated; wherein the main magnetic pole layer has an end face joint structure where respective end faces of the magnetic pole end part and a yoke magnetic pole part having a size greater than that of the magnetic pole end part are joined to each other, and a surface with a flat structure on a side closer to the thin-film coil.

In this thin-film magnetic head structure, the end face joint between the magnetic pole end part and the yoke magnetic pole part blocks the emission of remnant magnetization from the yoke magnetic pole part to the magnetic pole end part.

It will be preferred if the thin-film magnetic head structure further comprises a base insulating layer including a magnetic pole forming depression sunken into a form corresponding to the main magnetic pole layer, the magnetic pole forming depression having a very narrow groove part formed so as to define a track width of the thin-film magnetic head, whereas the respective end faces of the magnetic pole end part and yoke magnetic pole part are joined to each other within a region other than the very narrow groove part in the magnetic pole forming depression of the base insulating layer.

In this case, the main magnetic pole layer is formed so as to be embedded in the magnetic pole forming depression.

It will be preferred in the thin-film magnetic head structure if the magnetic pole end part and the yoke magnetic pole part are formed from respective magnetic materials having saturated magnetic flux densities different from each other. It will also be preferred if the saturated magnetic flux density of the magnetic pole end part is set higher than the saturated magnetic flux density of the yoke magnetic pole part.

The magnetic pole end part and the yoke magnetic pole part may be joined to each other by way of a nonmagnetic film made of a nonmagnetic material.

An upper yoke magnetic pole part having a size greater than that of the magnetic pole end part may be joined to a portion of the yoke magnetic pole part distant from the medium-opposing surface than the recording gap layer.

The very narrow groove part may be formed such that a groove width intersecting the length thereof gradually decreases along the depth thereof.

In another aspect, the present invention provides a method of manufacturing a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; the method comprising the steps of:

(1) forming an end-face-equipped magnetic pole layer having an exposed end face at a position where the magnetic pole end part is to be formed;

(2) forming a joining magnetic pole layer joined to the exposed end face of the end-face-equipped magnetic pole layer at a position where a yoke magnetic pole part having a size greater than that of the magnetic pole end part is to be formed;

(3) surface-flattening the end-face-equipped magnetic pole layer and joining magnetic pole layer on the side closer to the thin-film coil, so as to form the magnetic pole end part and the yoke magnetic pole part having a size greater than that of the magnetic pole end part;

(4) forming the recording gap layer with the magnetic pole end part and the yoke magnetic pole part;

(5) forming the thin-film coil with the yoke magnetic pole part such that the thin-film coil and the yoke magnetic pole part are in contact with each other by way of an insulating layer; and (6) forming the write shield layer such that the write shield layer opposes the magnetic pole end part by way of the recording gap layer.

In still another aspect, the present invention provides a method of manufacturing a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; the method comprising the steps of:

(1) forming a base insulating layer including a magnetic pole forming depression sunken into a form corresponding to the main magnetic pole layer, the magnetic pole forming depression having a very narrow groove part formed so as to define a track width of the thin-film magnetic head;

(2) forming an end-face-equipped magnetic pole layer having an in-depression end face exposed into a region other than the very narrow groove part in the magnetic pole forming depression of the base insulating layer;

(3) forming a joining magnetic pole layer joined to the in-depression end face in the end-face-equipped magnetic pole layer;

(4) surface-flattening the end-face-equipped magnetic pole layer and joining magnetic pole layer on the side closer to the thin-film coil, so as to form the magnetic pole end part and the yoke magnetic pole part having a size greater than that of the magnetic pole end part;

(5) forming the recording gap layer with the magnetic pole end part and the yoke magnetic pole part;

(6) forming the thin-film coil with yoke magnetic pole part such that the thin-film coil and the yoke magnetic pole part are in contact with each other by way of an insulation layer; and (7) forming the write shield layer such that the write shield layer opposes the magnetic pole end part by way of the recording gap layer.

The above-mentioned manufacturing methods may further comprise the step of forming a nonmagnetic film made of a nonmagnetic material at the exposed end face in the end-face-equipped magnetic pole layer, whereas the joining magnetic pole layer may be formed so as to join with the end-face-equipped magnetic pole layer by way of the nonmagnetic film.

The methods may further comprise the step of forming a nonmagnetic film made of a nonmagnetic material at the in-depression end face in the end-face-equipped magnetic pole layer, whereas the joining magnetic pole layer may be formed so as to join with the end-face-equipped magnetic pole layer by way of the nonmagnetic film.

The methods may further comprise the step of joining an upper yoke magnetic pole part having a size greater than that of the magnetic pole end part to a portion of the yoke magnetic pole part distant from the medium-opposing surface than the recording gap layer.

In still another aspect, the present invention provides a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; the thin-film magnetic head comprising a base insulating layer including a magnetic pole forming depression sunken into a form corresponding to the main magnetic pole layer, the magnetic pole forming depression having a very narrow groove part formed so as to define a track width of the thin-film magnetic head; wherein the main magnetic pole layer has an end face joint structure where respective end faces of the magnetic pole end part and a yoke magnetic pole part having a size greater than that of the magnetic pole end part are joined to each other, and a surface with a flat structure on a side closer to the thin-film coil.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIGS. 1A and 1B are sectional views of the thin-film magnetic head structure in accordance with a first embodiment of the present invention, in which FIG. 1A is a sectional view taken along a direction intersecting a thin-film coil, and FIG. 1B is a sectional view showing the ABS when cut at the ABS;

FIGS. 2A and 2B are views showing an insulating layer, in which FIG. 2A is a plan view, and FIG. 2B is a sectional view taken along the line B-B of FIG. 2A;

FIGS. 3A, 3B and 3C are views showing a major part of FIGS. 2A and 2B under magnification with changed ratios of dimensions, in which FIG. 3A is a plan view, FIG. 3B is a sectional view taken along the line B-B of FIG. 3A, and FIG. 3C is a sectional view showing the major part in FIG. 3B under magnification;

FIGS. 4A and 4B are views showing a main magnetic pole layer after being cut along the ABS, in which FIG. 4A is a perspective view, and FIG. 4B is a sectional view taken along the line B-B of FIG. 4A;

FIG. 5 is a plan view showing the main magnetic pole layer;

FIGS. 6A and 6B are views showing another main magnetic pole layer after being cut along the ABS, in which FIG. 6A is a perspective view, and FIG. 6B is a sectional view taken along the line B-B of FIG. 6A;

FIGS. 7A, 7B, 7C and 7D are plan views or sectional views in a step of the manufacturing method in accordance with the first embodiment, in which FIG. 7A is a plan view, FIG. 7B is a sectional view taken along the line B-B of FIG. 7A, FIG. 7C is a plan view showing a major part of FIG. 7A under magnification with changed ratios of dimensions, and FIG. 7D is a sectional view taken at the ABS in FIG. 7B;

FIGS. 8A, 8B, 8C and 8D are plan views or sectional views in a step subsequent to FIGS. 7A, 7B, 7C and 7D, in which FIG. 8A is a plan view, FIG. 8B is a sectional view taken along the line B-B of FIG. 8A, FIG. 8C is a plan view showing a major part of FIG. 8A under magnification with changed ratios of dimensions, and FIG. 8D is a sectional view taken at the ABS in FIG. 8B;

FIGS. 9A, 9B, 9C and 9D are plan views or sectional views in a step subsequent to FIGS. 8A, 8B, 8C and 8D, in which FIG. 9A is a plan view, FIG. 9B is a sectional view taken along the line B-B of FIG. 9A, FIG. 9C is a plan view showing a major part of FIG. 9A under magnification with changed ratios of dimensions, and FIG. 9D is a sectional view taken at the ABS in FIG. 9B;

FIGS. 10A, 10B, 10C and 10D are plan views or sectional views in a step subsequent to FIGS. 9A, 9B, 9C and 9D, in which FIG. 10A is a plan view, FIG. 10B is a sectional view taken along the line B-B of FIG. 10A, FIG. 10C is a plan view showing a major part of FIG. 10A under magnification with changed ratios of dimensions, and FIG. 10D is a sectional view taken at the ABS in FIG. 10B;

FIGS. 11A, 11B, 11C and 11D are plan views or sectional views in a step subsequent to FIGS. 10A, 10B, 10C and 10D, in which FIG. 11A is a plan view, FIG. 11B is a sectional view taken along the line B-B of FIG. 11A, FIG. 11C is a plan view showing a major part of FIG. 11A under magnification with changed ratios of dimensions, and FIG. 11D is a sectional view taken at the ABS in FIG. 11B;

FIGS. 12A and 12B are sectional views in a step subsequent to FIGS. 11A, 11B, 11C and 11D, in which FIG. 12A is a sectional view taken along a direction intersecting the thin-film coil, and FIG. 12B is a sectional view showing the ABS when cut at the ABS;

FIGS. 13A and 13B are sectional views in a step subsequent to FIGS. 12A and 12B, in which FIG. 13A is a sectional view taken along a direction intersecting the thin-film coil, and FIG. 13B is a sectional view showing the ABS when cut at the ABS;

FIGS. 14A and 14B are sectional views in a step subsequent to FIGS. 13A and 13B, in which FIG. 14A is a sectional view taken along a direction intersecting the thin-film coil, and FIG. 14B is a sectional view showing the ABS when cut at the ABS;

FIGS. 15A and 15B are sectional views in a step subsequent to FIGS. 14A and 14B, in which FIG. 15A is a sectional view taken along a direction intersecting the thin-film coil, and FIG. 15B is a sectional view showing the ABS when cut at the ABS;

FIGS. 16A and 16B are sectional views of the thin-film magnetic head structure in accordance with a second embodiment of the present invention, in which FIG. 16A is a sectional view taken along a direction intersecting a thin-film coil, and FIG. 16B is a sectional view showing the ABS when cut at the ABS;

FIGS. 17A, 17B, 17C and 17D are plan views or sectional views in a step of the manufacturing method in accordance with the second embodiment, in which FIG. 17A is a plan view, FIG. 17B is a sectional view taken along the line B-B of FIG. 17A, FIG. 17C is a plan view showing a major part of FIG. 17A under magnification with changed ratios of dimensions, and FIG. 17D is a sectional view taken at the ABS in FIG. 17B;

FIGS. 18A and 18B are sectional views in a step subsequent to FIGS. 17A, 17B, 17C and 17D, in which FIG. 18A is a sectional view taken along a direction intersecting the thin-film coil, and FIG. 18B is a sectional view showing the ABS when cut at the ABS;

FIGS. 19A and 19B are sectional views of the thin-film magnetic head structure in accordance with a modified example of the first embodiment, in which FIG. 19A is a sectional view taken along a direction intersecting the thin-film coil, and FIG. 19B is a sectional view showing the ABS when cut at the ABS;

FIGS. 20A and 20B are sectional views of the thin-film magnetic head structure in accordance with a modified example of the second embodiment, in which FIG. 20A is a sectional view taken along a direction intersecting the thin-film coil, and FIG. 20B is a sectional view showing the ABS when cut at the ABS;

FIGS. 21A and 21B are sectional views of the thin-film magnetic head structure in accordance with a third embodiment, in which FIG. 21A is a sectional view taken along a direction intersecting the thin-film coil, and FIG. 21B is a sectional view showing the ABS when cut at the ABS;

FIGS. 22A and 22B are sectional views of the thin-film magnetic head structure in accordance with a modified example of the third embodiment, in which FIG. 22A is a sectional view taken along a direction intersecting the thin-film coil, and FIG. 22B is a sectional view showing the ABS when cut at the ABS;

FIGS. 23A and 23B are sectional views showing a conventional method of manufacturing a thin-film magnetic head, in which FIGS. 23A and 23B illustrate respective states before and after etching.

FIGS. 24A and 24B are plan views showing the main magnetic pole layer in a conventional thin-film magnetic head, in which FIG. 24A illustrates the main magnetic pole layer as set, and FIG. 24B illustrates the main magnetic pole layer manufactured;

FIGS. 25A and 25B are sectional views showing a conventional method of manufacturing a thin-film magnetic head, in which FIG. 25A illustrates a state provided with a photoresist, and FIG. 25B illustrates a state after removing the photoresist;

FIGS. 26A and 26B are sectional views showing a conventional method of manufacturing a thin-film magnetic head, in which FIG. 26A illustrates a state provided with another photoresist, and FIG. 26B illustrates a state after removing the photoresist; and FIGS. 27A, 27B and 27C show examples of conventional thin-film magnetic heads, in which FIG. 27A is a sectional view, FIG. 27B is a front view showing the ABS, and FIG. 27C is a plan view.

DETAILED DESCRIPTION OF EMBODIMENTS

In the following, embodiments of the present invention will be explained with reference to the drawings. Constituents identical to each other will be referred to with numerals identical to each other without repeating their overlapping descriptions.

First Embodiment

Configuration of Thin-Film Magnetic Head Structure

Figures 1A, 1B:
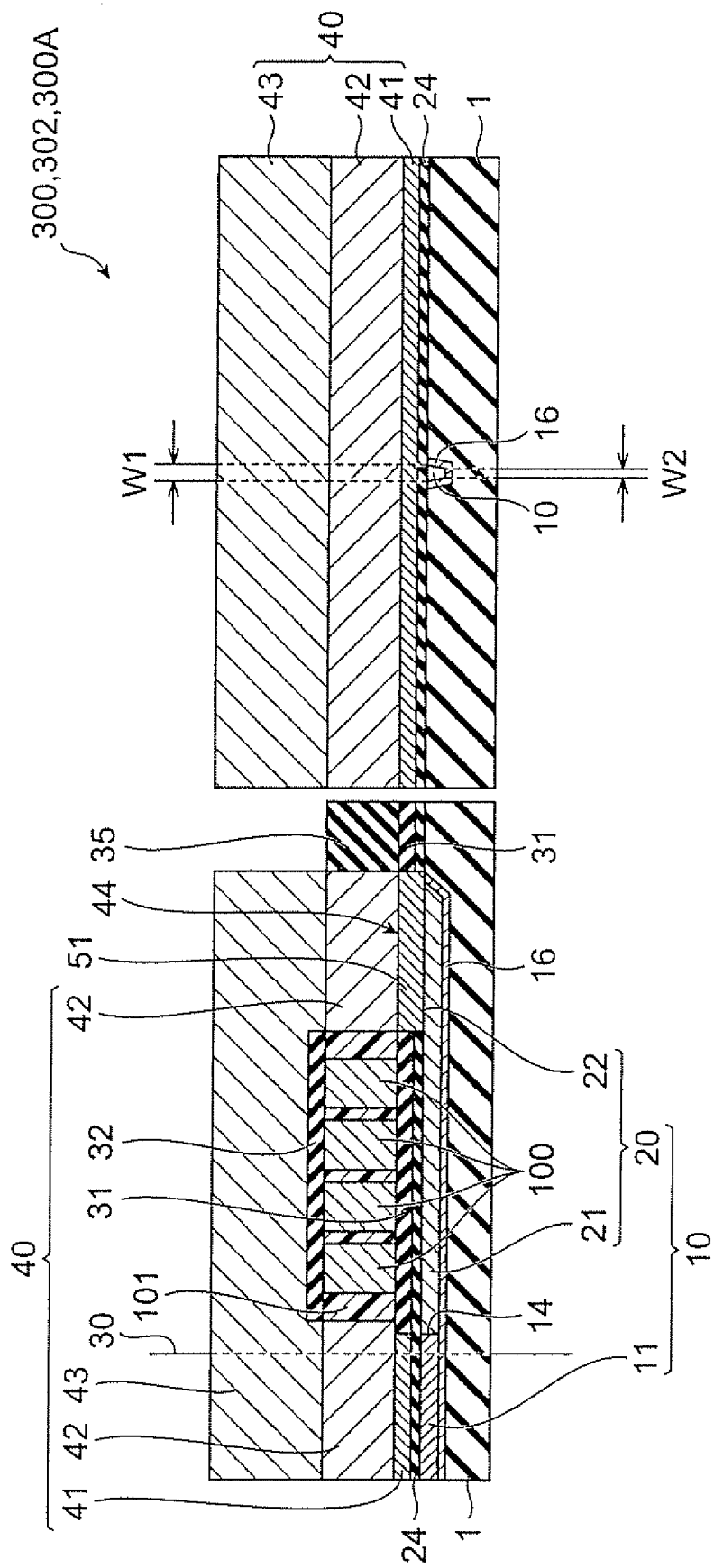

First, with reference to FIGS. 1 to 6, the configuration of the thin-film magnetic head structure in accordance with the first embodiment of the present invention will be explained. FIGS. 1A and 1B are sectional views of a thin-film magnetic head structure 300 in accordance with the first embodiment of the present invention, in which FIG. 1A is a sectional view taken along a direction intersecting a thin-film coil, and FIG. 1B is a sectional view showing the ABS when cut at the ABS.

The thin-film magnetic head structure 300 in accordance with the first embodiment has a configuration adapted to manufacture a magnetic head for perpendicular recording. The thin-film magnetic head structure 300 is formed on a substrate which is not depicted, and yields a thin-film magnetic head in the present invention when cut at an ABS 30 which is a medium-opposing surface opposing a recording medium (hard disk).

The thin-film magnetic head structure 300 comprises a substrate; a reproducing head structure, laminated on the substrate, for manufacturing a reproducing head comprising an MR device (magnetoresistive device) or the like; and a recording head structure for manufacturing a recording head. FIGS. 1A and 1B show the recording head structure laminated on the insulating layer 1, while omitting the substrate and the reproducing head structure.

The configuration of a major part of the recording head structure in the thin-film magnetic head structure 300 will be explained in the following, whereas the configuration of the other parts will be explained in manufacturing steps which will be set forth later. Each constituent in the recording head structure will be explained with the same name and numeral before and after being cut at the ABS 30 unless otherwise specified in particular. When distinguishing these states from each other, however, "'" will be added to the numeral referring to the state after being cut at the ABS 30.

The thin-film magnetic head structure 300 comprises the insulating layer 1, and a main magnetic pole layer 10, a recording gap layer 24, a write shield layer 40, a back magnetic pole layer 51, and a thin-film coil 100 which are laminated on the insulating layer 1.

Figure 2A:
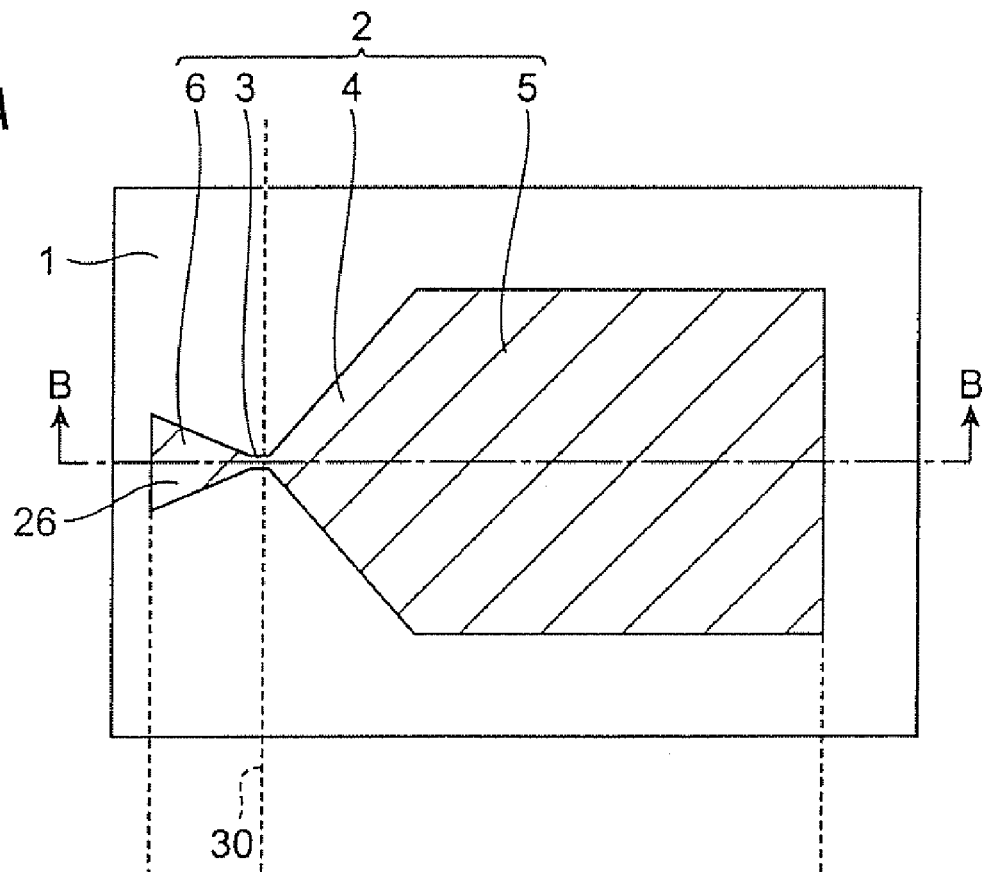
Figure 2B:
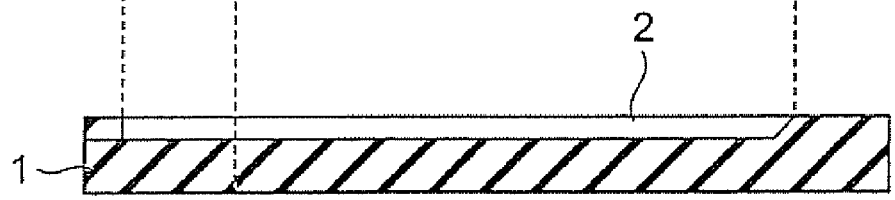
Figure 3A:
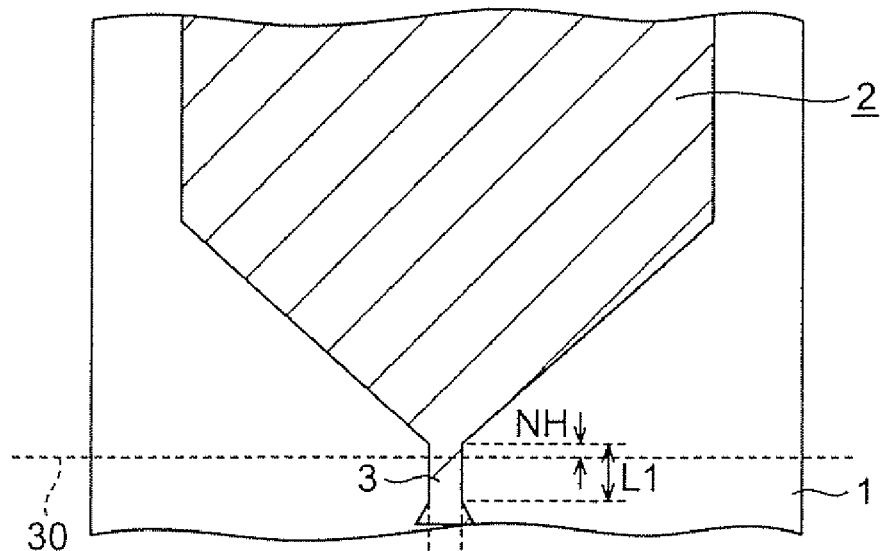
Figure 3B:
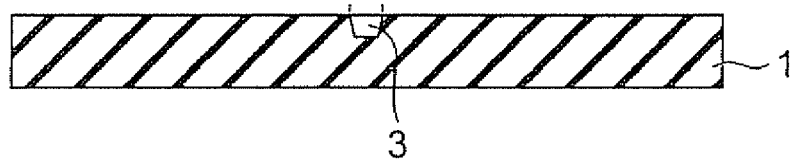
Figure 3C:
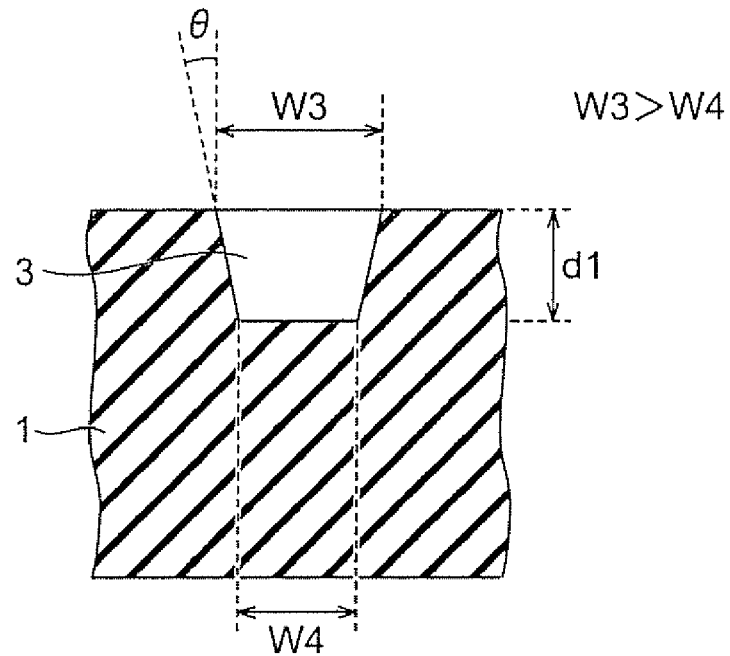

The insulating layer 1 is the base insulating layer in the present invention and is formed in a predetermined region on the substrate. FIGS. 2A and 2B are views showing the insulating layer 1, in which FIG. 2A is a plan view, and FIG. 2B is a sectional view taken along the line B-B of FIG. 2A. FIGS. 3A, 3B and 3C are views showing a major part of FIGS. 2A and 2B, in which FIG. 3A is a plan view, FIG. 3B is sectional view taken along the line B-B of FIG. 3A, and FIG. 3C is a sectional view showing the major part in FIG. 3B under magnification with changed ratios of dimensions. In the insulating layer 1, FIGS. 2A and 2B show a rectangular predetermined region centered at a cavity 2 which will be explained later.

The insulating layer 1 is made of alumina ($Al_2O_3$) and has the cavity 2 at a center part (hatched part in FIG. 2A and FIG. 3A on the side of a surface to be formed with a recording head. The cavity 2 is the magnetic pole forming depression in the present invention, and is sunken into a form corresponding to the outer form of the main magnetic pole layer 10 in order to form the main magnetic pole layer 10 in set dimensions and shape. Namely, as will be explained later in detail, the cavity 2 is formed earlier than the main magnetic pole layer 10, such that its dimensions and shape including the depth d1 (about 0.25 to 0.35 µm, preferably 0.3 µm), width, and length coincide with assumed thickness, width, and length of the main magnetic pole layer 10. The cavity 2 includes a very narrow groove part 3, a variable width depression 4, a fixed width depression 5, and a protruded depression 6, whereas a magnetic material embedded therein forms the main magnetic pole layer 10.

The very narrow groove part 3 is formed so as to define the track width of the thin-film magnetic head, and has a structure adapted to improve the recording density by reducing the track width. As shown in FIGS. 3A, 3B and 3C, the length of the narrow groove 3 is set to L1 (longer than a neck height NH which will be explained later, i.e., L1>NH) such that the ABS 30 can be secured in an intermediate part of the length. The groove width intersecting the length is W3 on the surface side, and is W4 on the lower side, whereas the groove width W3 and W4 are made narrower than the variable width depression 4 and fixed width depression 5 as much as possible, so as to yield a very narrow structure in order to improve the recording density of the thin-film magnetic head. Also, the groove width gradually decreases along the depth such that a magnetic pole end part 11 which will be explained later has a bevel form. Namely, the groove width W4 is smaller than the groove width W3 (W3>W4) in the very narrow groove part 3, so that the bevel angle θ shown in FIG. 3C becomes about 7 to 12 degrees (e.g., 10 degrees).

The variable width depression 4, whose groove width gradually increases, is connected to the very narrow groove part 3. The distance from the boundary part between the variable width depression 4 and very narrow groove part 3 to the ABS 30 will later become the neck height NH. The fixed width depression 5 having a constant groove width is connected to the variable width depression 4. The protruded depression 6 is connected to the end part of the very narrow groove part 3 opposite from the variable width depression 4.

Figure 4A:
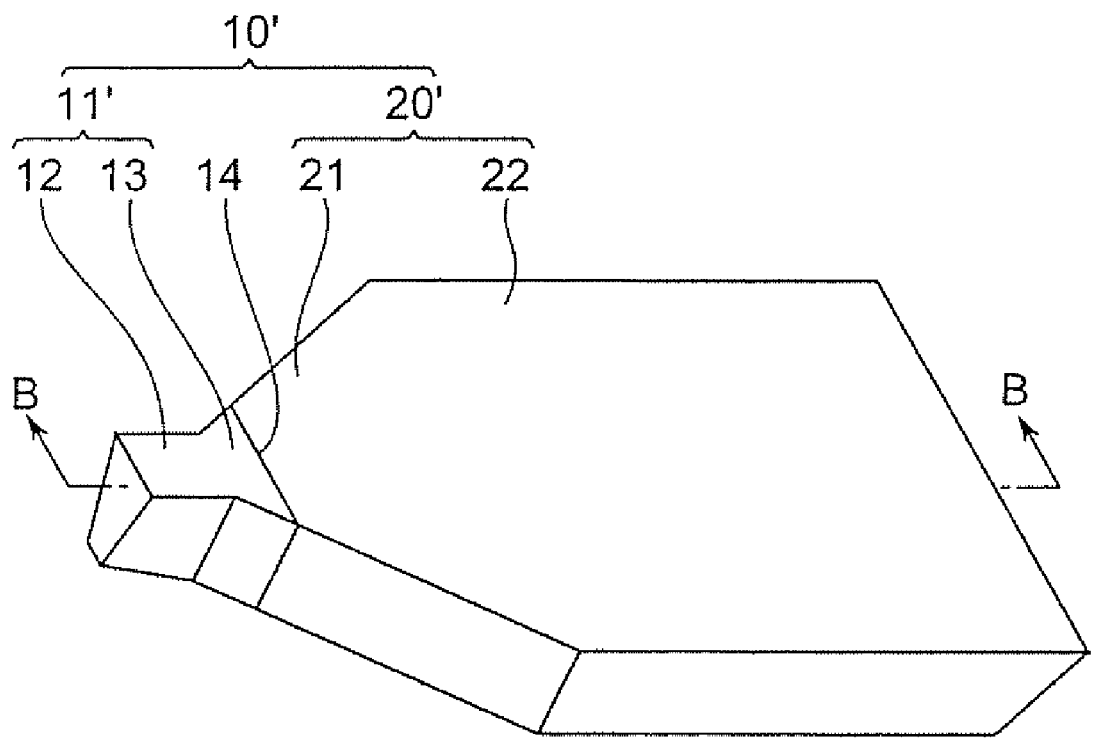
Figure 4B:
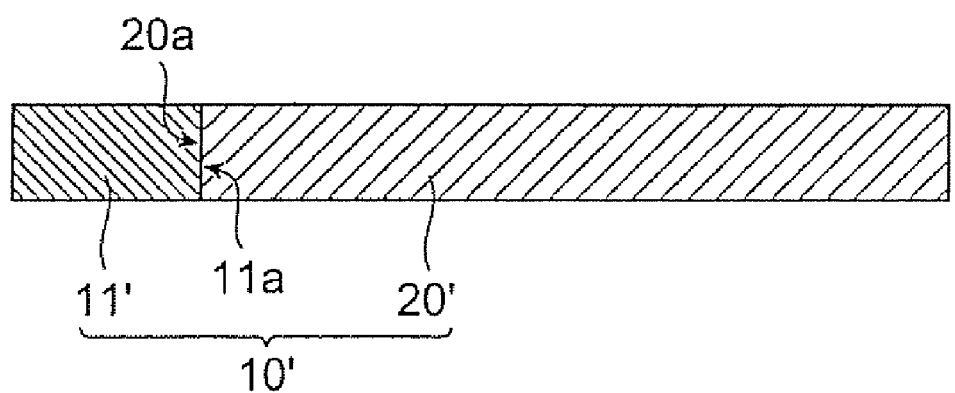

As shown in FIGS. 4A, 4B and FIG. 5, the main magnetic pole layer 10' (as with the main magnetic pole layer 10 before cutting) comprises a magnetic pole end part 11' and a yoke magnetic pole part 20', whereas its surface on the side closer to the thin-film coil 100 has a stepless flat structure. FIGS. 4A and 4B are views showing the main magnetic pole layer 10' after being cut along the ABS 30, in which FIG. 4A is a perspective view, and FIG. 4B is a sectional view taken along the line B-B of FIG. 4A. FIG. 5 is a plan view showing the main magnetic pole layer 10'. The main magnetic pole layer 10' is formed so as to be embedded in the cavity 2. The main magnetic pole layer 10' has an end face joint structure in which respective end faces of the magnetic pole end part 11' and yoke magnetic pole part 20' extending along the ABS 30 are joined to each other in a region (variable width depression 4) other than the very narrow groove part 3 in the cavity 2. The joint of the end faces forms an interface 14.

The magnetic pole end part 11' (as with the magnetic pole end part 11 before cutting) is disposed at a position closer to the ABS 30 than is the yoke magnetic pole part 20'. The magnetic pole end part 11' comprises a track width defining part 12 having a constant width for defining the track width, a variable width part 13 whose width extending along the ABS 30 gradually increases in the direction away from ABS 30. The magnetic pole end part 11' has a length D2 from the ABS 30. The length D2 is shorter than the length D1 from the ABS 30 to the rear end part of the yoke magnetic pole part 20', so as to yield a shortened structure in which the magnetic pole end part 11' is not connected to the write shield layer 40.

In order to achieve a higher data recording density by the thin-film magnetic head, the magnetic pole end part 11 has a narrow track width structure in which a width W1 to be explained later is narrowed. However, the magnetic pole end part 11 uses a magnetic material (Hi-Bs material) having a saturated magnetic flux density higher than that of the yoke magnetic pole part 20 so as not to be saturated with magnetic fluxes even in the narrow track width structure. The magnetic pole end part 11 and yoke magnetic pole part 20 are magnetized such that the direction of magnetization ms aligns with the ABS 30 (see FIG. 5).

The track width defining part 12 has a width determined by the very narrow groove part 3. Along the ABS 30, the track width defining part 12 has a width W1 on the side closer to the thin-film coil 100, and a width W2 on the side farther from the thin-film coil 100, thereby yielding a bevel form whose width gradually decrease in the direction away from the thin-film coil 100 (W1>W2, whereas the width W1 is the track width). These widths W1 and W2 correspond to the groove widths W3 and W4 of the very narrow groove part 3 in the cavity 2, respectively.

The length of the track width defining part 12 (distance from the ABS 30) corresponds to the neck height NH (which is on the order of 0.1 to 0.3 μm, preferably 0.15 μm in this embodiment).

The variable width part 13 is integrally formed with the track width defining part 12 from the same magnetic material as that of the latter, while the length from the ABS 30 is made shorter so as not to be connected to the back magnetic layer 51. The end face extending along the ABS 30 in the variable width part 13 is a joining end face 11a, which is connected to a joining end face 20a of the yoke magnetic pole part 20', which will be explained later. The joining end faces 11a and 20a form the interface 14. The interface 14 is substantially parallel to the ABS 30.

The yoke magnetic pole part 20' has a size (area) greater than that of the magnetic pole end part 11'. The yoke magnetic pole part 20' comprises a variable width region 21 whose width gradually increases in the direction away from the ABS 30, and a fixed width region 22 having a constant width. In the variable width region 21, the end face extending along the ABS 30 on the ABS 30 side is the joining end face 20a. At a position distant from the ABS 30 than the recording gap layer 24, the fixed width region 22 is magnetically connected to the back magnetic pole layer 51.

By way of the recording gap layer 24 and an insulating layer 31, the thin-film coil 100 is formed so as to ride on the variable width region 21 and fixed width region 22 of the yoke magnetic pole part 20'.

Referring to FIGS. 1A and 1B again, the recording gap layer 24 is formed between the main magnetic pole layer 10 and a first shield part 41 of the write shield layer 40, which will be explained later, and the insulating layer 31.

The write shield layer 40 comprises the first shield part 41, a second shield part 42, and a third shield part 43. The first shield part 41 is formed so as to oppose the magnetic pole end part 11 of the main magnetic pole layer 10 by way of the recording gap layer 24 on the ABS 30 side, whereby the neck height NH is determined by the distance from the ABS 30 in a direction intersecting the ABS 30.

The second shield part 42 is formed so as to connect with the first shield part 41 and back magnetic pole layer 51 from the side closer to the thin-film coil 100, and has a height equivalent to the thickness of the thin-film coil 100.

The third shield part 43 is formed so as to connect with the second shield part 42 and cover the thin-film coil 100 and a photoresist 101 by way of an insulating layer 32.

The back magnetic pole layer 51 is connected to the yoke magnetic pole part 20 in a part distant from the ABS 30 than the recording gap layer 24. The back magnetic pole layer 51 is magnetically connected to the second shield part 42, and forms a joint 44 together with the second shield part 42.

The thin-film coil 100 is wound in a planar spiral about the write shield layer 40 while being insulated therefrom by way of the insulating layers 31, 32. Though not depicted, the thin-film magnetic head 100 may be changed to a helical coil spirally wound about the main magnetic pole layer 10.

Thus configured thin-film magnetic head structure 300 is cut so as to form the ABS 30 in an intermediate part of the very narrow groove part 3, whereby a thin-film magnetic head 300A in accordance with the present invention (see FIGS. 1A and 1B) is obtained.

In conventional PMRs, as in the thin-film magnetic head 400 shown in FIGS. 27A, 27B and 27C, the main magnetic pole layer 402 is formed by the same magnetic material from the ABS 403 to the opposite end part by way of the thin-film coil. Therefore, the remnant magnetization mr is directed to the ABS 403, thus making it difficult to prevent the pole erasure from occurring.

In the thin-film magnetic head structure 300 in accordance with this embodiment, by contrast, the recording head structure includes the above-mentioned main magnetic pole layer 10, whereas the main magnetic pole layer 10 has an end face joint structure formed by two magnetic poles, i.e., the magnetic pole end part 11 and yoke magnetic pole part 20. As shown in FIG. 5, the interface 14 formed by the end face joint between the magnetic pole end part 11 and yoke magnetic pole part 20 blocks the emission of remnant magnetization $mr_{20}$ from the yoke magnetic pole part 20 to the magnetic pole end part 11. As a consequence, the thin-film magnetic head structure 300 can make a thin-film magnetic head with reduced remnant magnetization mr directed to the ABS 30. Therefore, using the thin-film magnetic head structure 300 can manufacture a thin-film magnetic head which can effectively prevent the pole erasure from occurring.

Since the magnetic pole end part 11 is made smaller than the yoke magnetic pole part 20, such that the yoke magnetic pole part 20 has a size (area) greater than that of the magnetic pole end part 11, the quantity of magnetization (also known as magnetic volume) of the yoke magnetic pole part 20 is greater than that of the magnetic pole end part 11. However, the interface 14 blocks the emission of remnant magnetization from the yoke magnetic pole part 20 having a greater quantity of magnetization, so that the emission of remnant magnetization decreases drastically, whereby the pole erasure is more effectively prevented from occurring. When the width of the very narrow groove part 3 is made as narrow as possible, the track width can be reduced, whereby the recording density can be improved. Therefore, the thin-film magnetic head structure 300 can manufacture a thin-film magnetic head which can effectively prevent the pole erasure from occurring, while improving the recording density.

Meanwhile, in the case of a conventional PMR, the main magnetic pole layer is preferably a magnetic material with a small maximum coercivity Hc (about 1-10 Oe) and a small magnetostriction $\lambda$ (1-3×10$^{-6}$), while it is also preferably a magnetic material with a small magnetostriction $\lambda$ in order to eliminate the aforementioned pole erasure.

However, in order to avoid impairment in the overwrite characteristic which occurs with flux saturation even if the track width is narrowed to improve the recording density, the magnetic material of the main magnetic pole layer is preferably formed of a magnetic material with a high saturated flux density, but when this is done it becomes difficult to lower the magnetostriction $\lambda$ of the main magnetic pole layer. In view of this point, the above-mentioned thin-film magnetic head structure 300 forms the main magnetic pole layer 10 as a joint structure made of the magnetic pole end part 11 and yoke magnetic pole part 20 having respective saturated magnetic flux densities different from each other, while the saturated magnetic flux density of the yoke magnetic pole part 20 is made lower than that of the magnetic pole end part 11, so as to reduce the magnetostriction $\lambda$ of the yoke magnetic pole part 20. This makes the main magnetic pole layer 10 reduce the magnetostriction $\lambda$ as a whole. Hence, using the thin-film magnetic head structure 300 yields a thin-film magnetic head which can more effectively prevent the pole erasure from occurring.

In addition, the thin-film magnetic head structure 300 includes the insulating layer 1 provided with the cavity 2 in which the main magnetic pole layer 10 is embedded, and thus exhibits the following operations and effects. The operations and effects of the thin-film magnetic head structure 300 and the thin-film magnetic head manufactured therefrom will now be explained in comparison with the conventional PMRs.

In order to for the ABS-side portion of the magnetic pole end part in the main magnetic pole layer to be formed like a bevel, the following procedure has been employed in conventional PMRs. Namely, in the conventional PMRs, there has been a case where, as shown in FIG. 23A, a main magnetic pole layer 501 formed on an insulating layer 500 is formed with an insulating layer 502 made of alumina, and is subjected to ion beam etching (hereinafter referred to as "IBE") by direct irradiation with ion beams P. In this case, the etching speed by the IBE is slower in the magnetic pole end part in the main magnetic pole layer 501 than in the insulating layer 500, whereby the IBE must be performed for a long time in order for the magnetic pole end part to attain a bevel form. As a consequence, the ABS-side portion of the magnetic pole end part tends to have a form including a narrowed part 501a having a smaller diameter as shown in FIG. 23B.

Figure 24A:
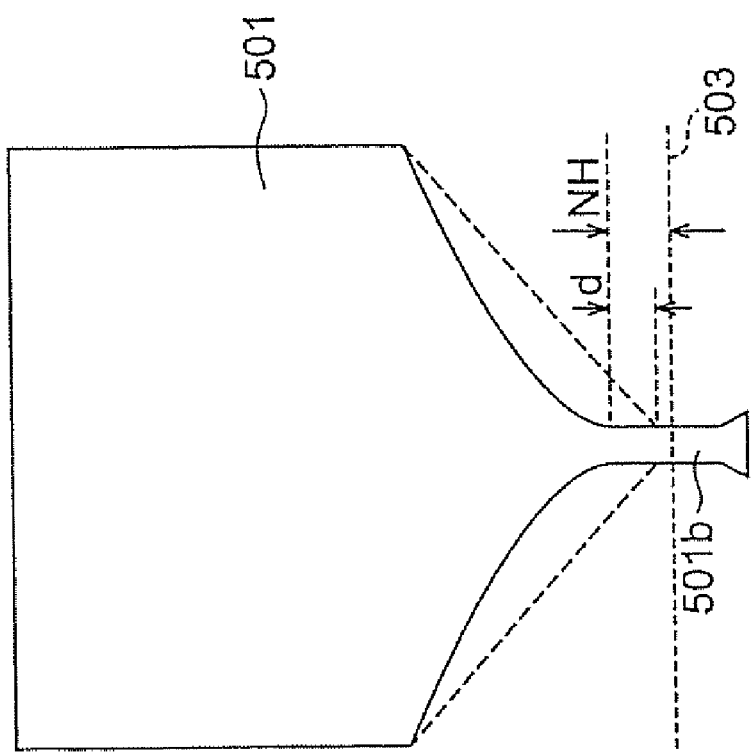
Figure 24B:
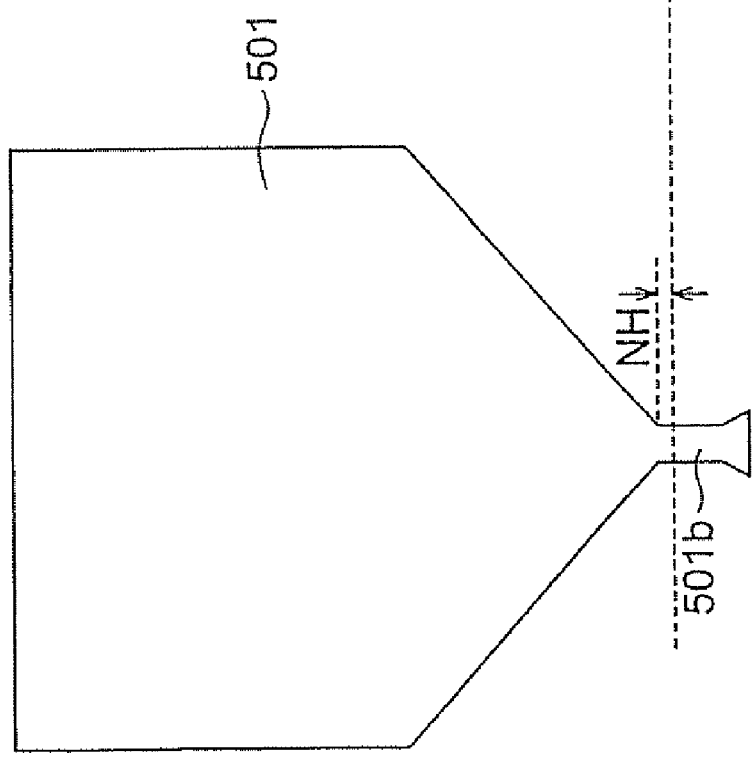

Therefore, even when the main magnetic pole layer 501 is intended to be formed as shown in FIG. 24A, a narrow band part 501b corresponding to the track width may retract as shown in FIG. 24B, so as to yield a flare point, thereby making the neck height NH longer than its expected length (about 0.15 µm) by d (about 0.2 to 0.3 µm). Therefore, the conventional PMRs have been hard to increase the quantity of magnetization in places near the ABS 503, which makes it difficult to yield a favorable overwrite characteristic (a characteristic by which data recorded on a recording medium is overwritten with another data).

Figures 25A, 25B:
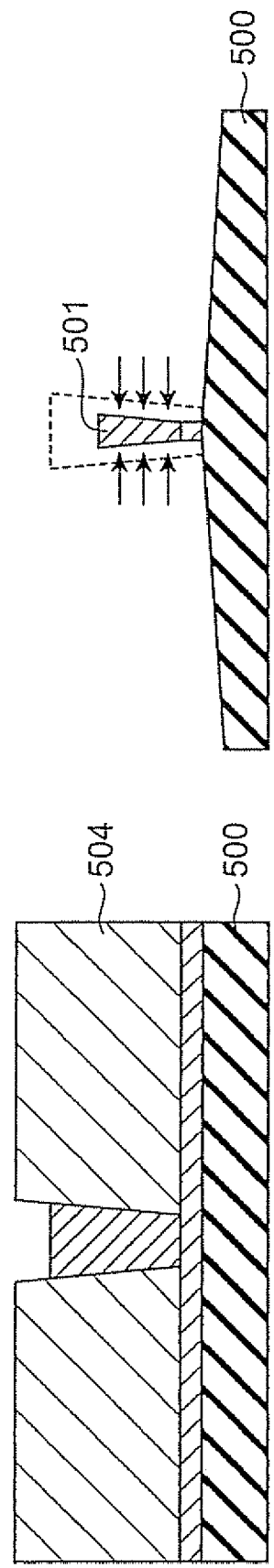

The magnetic pole end part in the main magnetic pole layer 501 has conventionally been formed by plating using photolithography. In order for the ABS-side portion to have a bevel form, a resist pattern 504 having a taper angle as shown in FIG. 25A may be used. When the track width is to be narrowed in order to improve the recording density in this case, the ion beams P must be emitted after removing the resist pattern 504 as shown in FIG. 25B, so as to perform trimming with the IBE for a long time. This may make the track width unfavorable or deteriorate the yield.

Figures 26A, 26B:
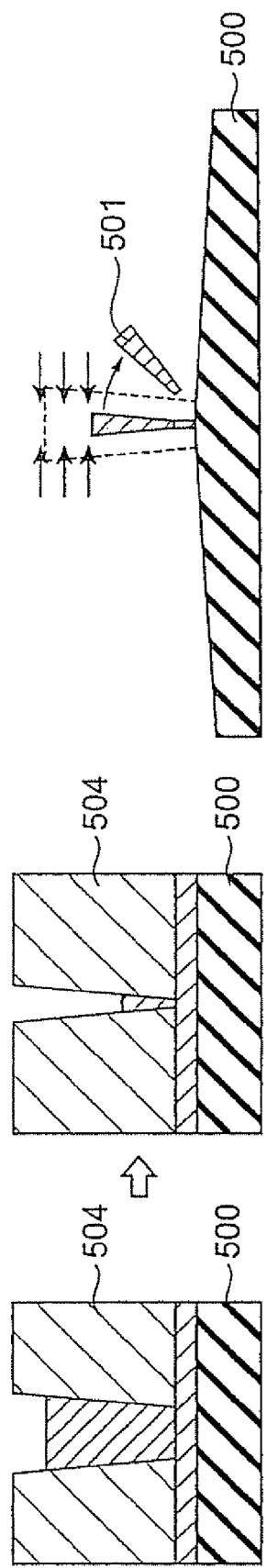

On the other hand, it has been quite difficult to perform plating while using a narrow resist pattern, thus leaving a fear of the formed magnetic pole end part falling down because of the IBE as shown in FIGS. 26A and 26B.

Thus, the conventional PMRs have also been problematic in that the main magnetic pole layer becomes harder to form reliably when the recording density is to be improved.

By contrast, the thin-film magnetic head structure 300 in this embodiment includes the insulating layer 1 provided with the cavity 2, in which the main magnetic pole layer 10 is embedded, and thus can eliminate all of the foregoing problems.

Namely, since the cavity 2 is sunken into a form corresponding to the outer form of the main magnetic pole layer 10, the main magnetic pole layer 10 can be formed in the shape and dimensions as set when formed so as to be embedded into the cavity 2. Since the track width is determined by the very narrow groove part 3 of the cavity 2, there is no need to perform the IBE for a long time at all in order for the magnetic pole end part to have a bevel form. Therefore, the neck height can be set to a value as assumed, the quantity of magnetism in places near the ABS 403 can be enhanced, and a thin-film magnetic head having a favorable overwrite characteristic can be manufactured.

The track width can be narrowed if the width of the very narrow groove part 3 is reduced as much as possible, whereas the very narrow groove part 3 can set the track width to a value assumed. Therefore, not only the track width is narrow, but also the dimensional accuracy and yield become favorable, and there is no fear of the formed magnetic pole end part falling down. Therefore, providing the cavity 2 as in the thin-film magnetic head structure 300 can reliably form the main magnetic pole layer having an enhanced recording density.

MODIFIED EXAMPLE 1

Figure 6A:
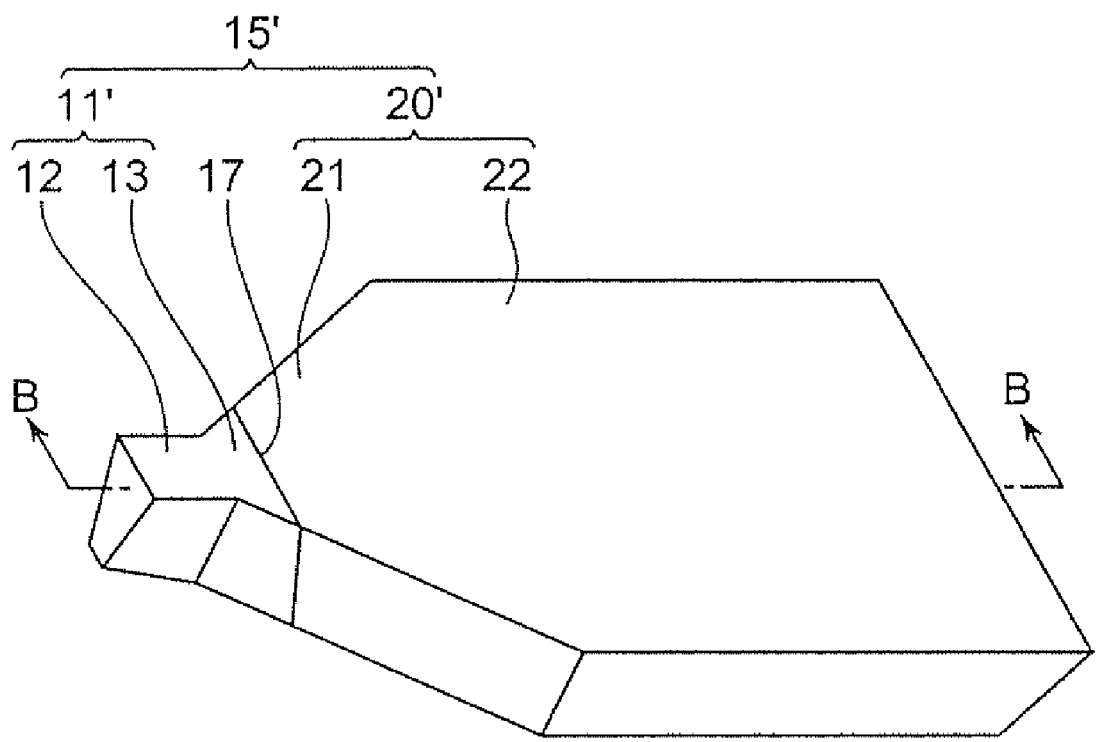
Figure 6B:
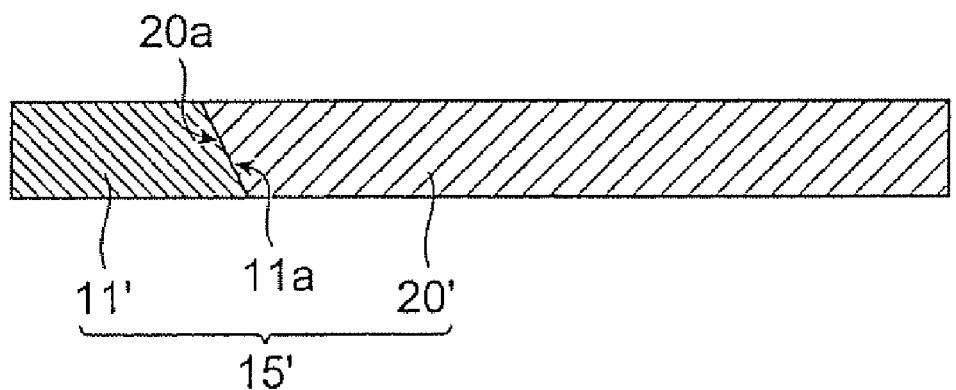

The above-mentioned thin-film magnetic head structure 300 includes the main magnetic pole layer 10 in which the interface 14 is formed substantially parallel to the ABS 30. However, the thin-film magnetic head structure 300 may have a main magnetic pole layer 15 as shown in FIGS. 6A and 6B. Unlike the interface 14, the interface 17 in the main magnetic pole layer 15 is tilted by a fixed inclined angle with respect to the ABS 30. The same operations and effects as those of the above-mentioned thin-film magnetic head structure 300 and the thin-film magnetic head 300A manufactured therefrom are exhibited in this case as well.

MODIFIED EXAMPLE 2

In the above-mentioned thin-film magnetic head structure 300, the insulating layer 1 includes the cavity 2 within which the magnetic pole end part 11 and the yoke magnetic pole part 20 are joined to each other. However, the thin-film magnetic head structure in the present invention may be a thin-film magnetic head structure 302 (see FIGS. 1A and 1B) using no cavity as well. The thin-film magnetic head structure 302 has the same cross-sectional structure as with the thin-film magnetic head structure 300 shown in FIGS. 1A and 1B, and includes an end face joint structure in which respective end faces of the magnetic pole end part 11 and the yoke magnetic pole part 20 are joined to each other, whereas the surface on the side closer to the thin-film coil 100 has a flat structure. Therefore, the thin-film magnetic head structure 302 can also manufacture a thin-film magnetic head adapted to effectively prevent the pole erasure from occurring, while improving the recording density.

Method of Manufacturing Thin-Film Magnetic Head Structure

With reference to FIGS. 1A, 1B, 1C, 2A, 2B, 3A, 3B and 3C mentioned above and FIGS. 7A, 7B, 7C and 7D to FIGS. 11A, 11B, 11C and 11D, and FIGS. 12A and 12B to FIGS. 15A and 15B, a method of manufacturing the thin-film magnetic head structure 300 having the above-mentioned configuration in accordance with the first embodiment will be explained.

FIGS. 7A, 7B, 7C and 7D to FIGS. 15A and 15B are plan or sectional views in respective steps of the manufacturing method, in which FIGS. 7A, 8A, 9A, 10A, 11A, 12A, 13A, 14A and 15A are plan views and FIGS. 7B, 8B, 9B, 10B, 11B, 12B, 13B, 14B and 15B are sectional views taken along the line B-B of FIGS. 7A, 8A, 9A, 10A, 11A, 12A, 13A, 14A and 15A. FIGS. 7C, 8C, 9C, 10C and 11C are plan views showing a major part of FIGS. 7A, 8A, 9A, 10A, 11A, 12A, 13A, 14A and 15A under magnification, and FIGS. 7D, 8D, 9D, 10D and 11D are sectional views taken at the ABS 30 of FIGS. 7B, 8B, 9B, 10B, 11B, 12B, 13B, 14B and 15B. For convenience of illustration, FIGS. 7C, 8C, 9C, 10C and 11C in each drawing show the major part of FIGS. 7A, 8A, 9A, 10A, 11A, 12A, 13A, 14A and 15A under magnification with a changed ratio of dimensions.

First, in the manufacturing method in accordance with this embodiment, a reproducing head structure comprising an MR device (magnetoresistive device) and the like is laminated on an undepicted substrate made of aluminum oxide titanium carbide ($Al_2O_3 \cdot TiC$), for example. Subsequently, an insulating layer 1 is formed from alumina ($Al_2O_3$) or a nonmagnetic material.

After a photoresist is applied onto the insulating layer 1, patterning is performed with a predetermined photomask, so as to yield a resist pattern exposing the surface of the insulating layer 1 into a form corresponding to the cavity 2. Using this resist pattern as a mask, reactive ion etching (hereinafter referred to as "RIE") is carried out, so as to remove the part of insulating layer 1 not covered with the resist pattern, whereby the cavity 2 is formed as shown in FIGS. 2A and 2B. The (very narrow groove part 3 of the) cavity 2 formed at that time determines the track width of the thin-film magnetic head.

Figure 7A:
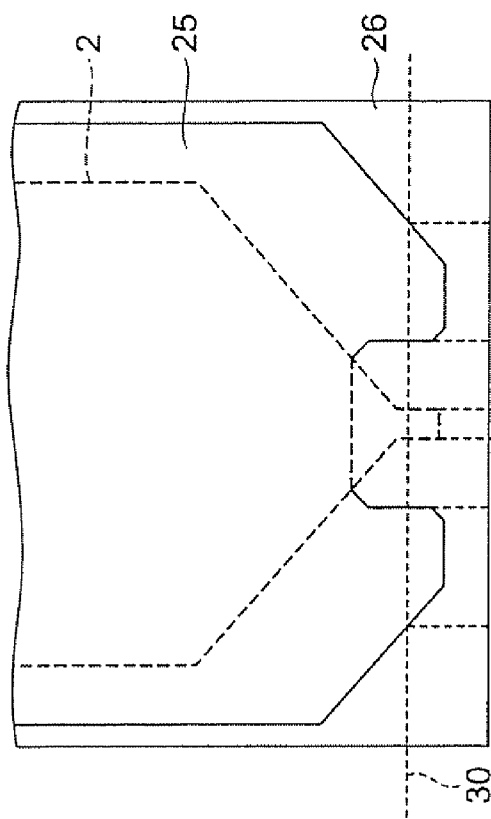
Figure 7B:
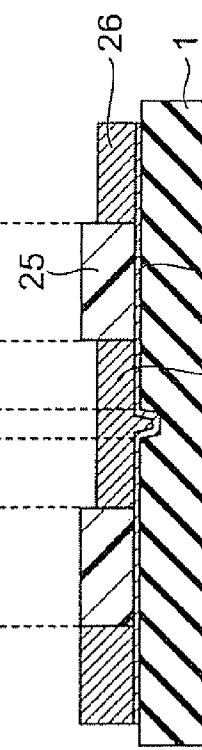
Figure 7C:
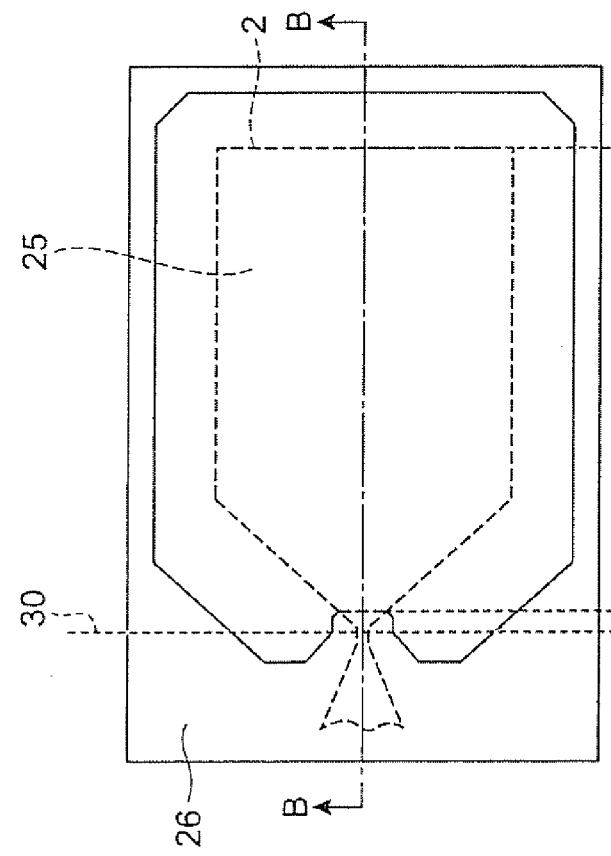
Figure 7D:

Next, as shown in FIG. 7A, a coating 16 made of Ta, W, TiN, or the like is formed on the whole surface of the insulating layer 1 by a thickness of about 200 to 500 Å by CVD or sputtering. Also, by sputtering or IBD, a coating to become a seed layer for plating with a magnetic material which will be performed later is formed on the coating 16 so as to fill the cavity 2. Subsequently, after a photoresist is applied onto the whole surface of the insulating layer 1, patterning is performed with a predetermined photomask, so as to yield a resist pattern 25 which covers substantially the whole area of the variable width depression 4 of the cavity 2, the fixed width depression 5, and surrounding parts thereof while exposing the other part of the coating 16, in order to form a magnetic layer 26, which will be explained later, at a position to form a magnetic pole end part 11.

Then, using CoNiFe having a high saturated magnetic flux density of 2.3 T to 2.4 T as a magnetic material, plating is performed with the resist pattern 25 acting as a mask. As a result, the magnetic layer 26 is formed in the part not covered with the resist pattern 25. This magnetic layer 26 will later form the magnetic pole end part 11. The magnetic layer 26 is formed by plating in the area to form the magnetic pole end part 11.

Figure 8A:
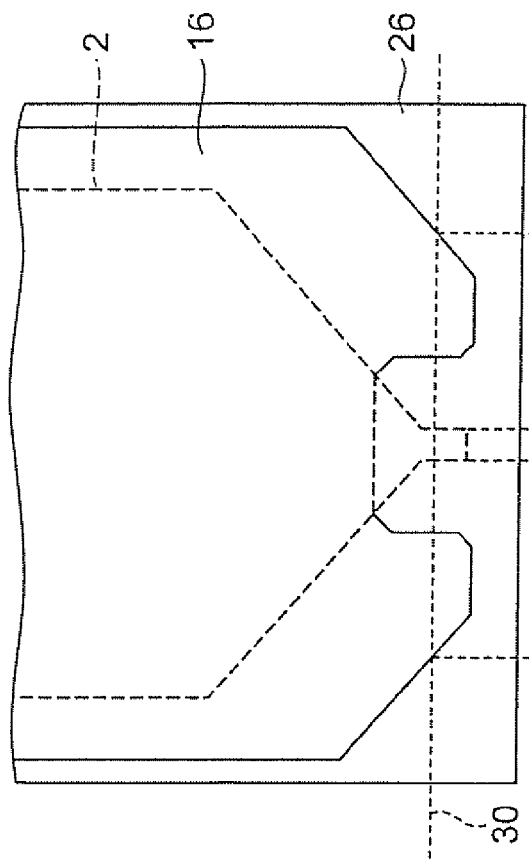
Figure 8C:
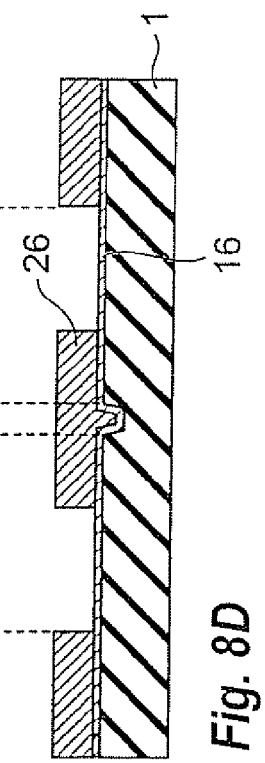
Figure 8B:
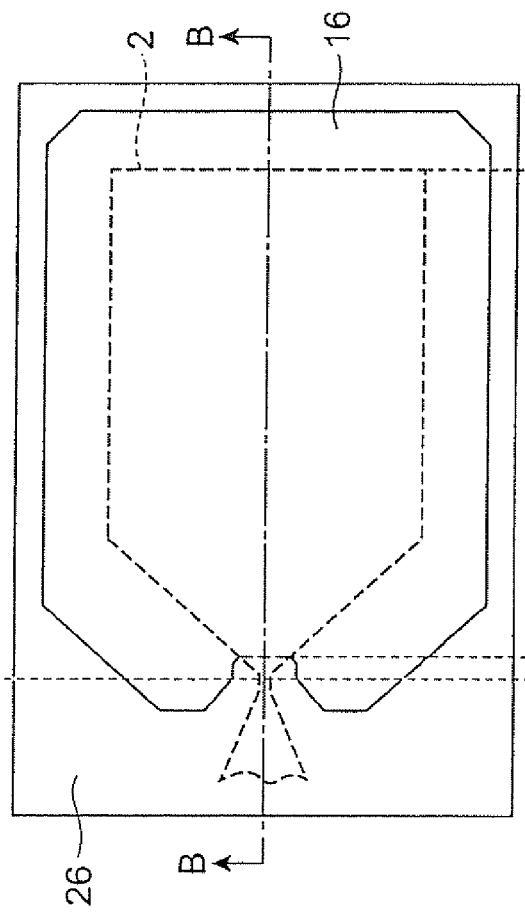
Figure 8D:
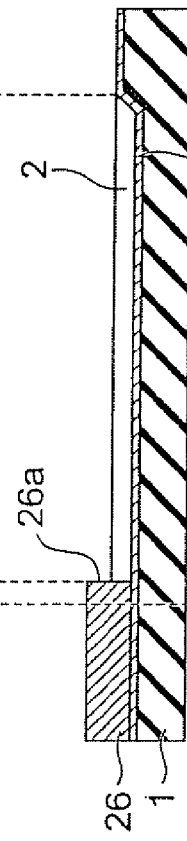

Next, the resist pattern 25 is removed, whereby a state in which the magnetic layer 26 is left in the regions not covered with the resist pattern 25 in the insulating layer 1 (the region for forming the magnetic pole end part 11 and the protruded depression 6 in the cavity 2 and surrounding regions of the cavity 2) is obtained as shown in FIGS. 8A and 8C. Here, the magnetic layer 26 includes an in-depression inner end face 26a (see FIG. 8A) exposed into a region other than the very narrow groove part 3 in the cavity 2, and acts as the end-face-equipped magnetic pole layer in the present invention. In this case, the length of the in-depression inner end face 26a can be changed by adjusting the position at which the resist pattern 25 is formed. As the in-depression inner end face 26a is made longer, the size of the in-depression inner end face 26a becomes greater, whereby the connection with a magnetic layer 27 which will be explained later becomes more reliable. However, the interface 14 is distanced farther from the ABS 30, so that the quantity of magnetization in the yoke magnetic pole layer 20 becomes smaller, whereby the pole erasure is more likely to occur. In order for the pole erasure to become harder to occur, it will be sufficient if the in-depression inner end face 26a is made shorter, although this will make the connection with the magnetic layer 27 more difficult. In view of these points, the position at which the resist pattern 25 is formed is adjusted.

Subsequently, as shown in FIGS. 9A and 9C, the magnetic layer 27 having a thickness on the order of 0.5 to 0.8 μm is formed by sputtering using CoFe having a saturated magnetic flux density lower than that of the magnetic layer 26 or CoNiFe having a saturated magnetic flux density of 1.9 to 2.1 T with lower magnetostriction λ and maximum coercivity Hc as a magnetic material on the whole surface of the insulating layer 1 including the position where the yoke magnetic pole part 20 is to be formed. Namely, the magnetic layer 27 is formed by sputtering in a region for forming the yoke magnetic pole part 20, which is wide than the magnetic pole end part 11.

When the magnetic layer 27 is formed, the magnetic layer 27 is joined to the in-depression inner end face 26a of the magnetic layer 26, whereby their junction forms an interface 28. Namely, the magnetic layer 27 is the joining magnetic pole layer in the present invention. The magnetic layer 27 will later form the yoke magnetic pole part 20. The interface 28 will later become the interface 14. Further, an insulating layer 29 made of alumina ($Al_2O_3$) is formed by a thickness on the order of 0.5 to 1.0 μm on the outside of the insulating layer 1 in the whole surface of the substrate. (The insulating layer 29 is not shown in FIG. 9A).

Figure 10A:
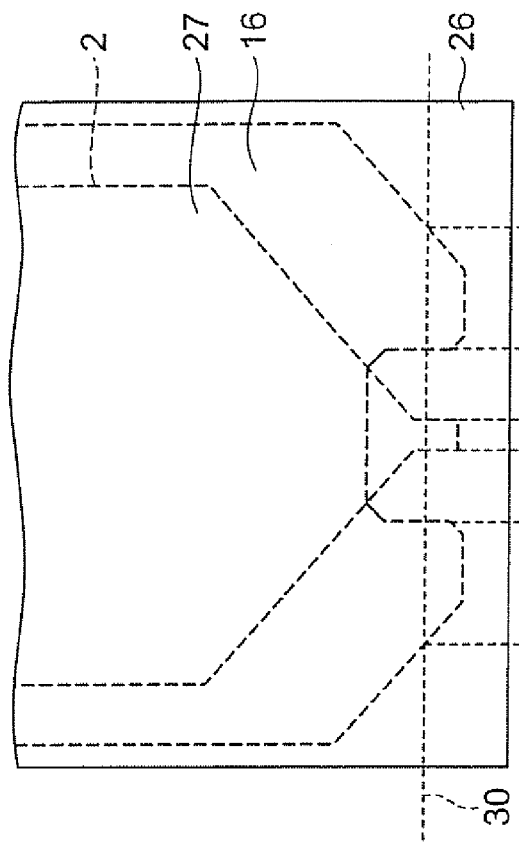
Figure 10B:
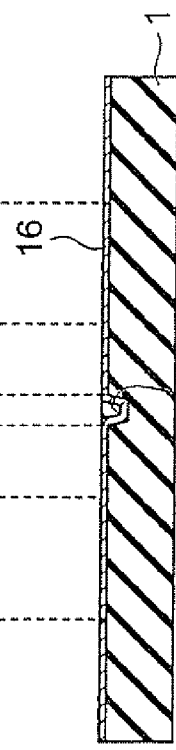
Figure 10C:
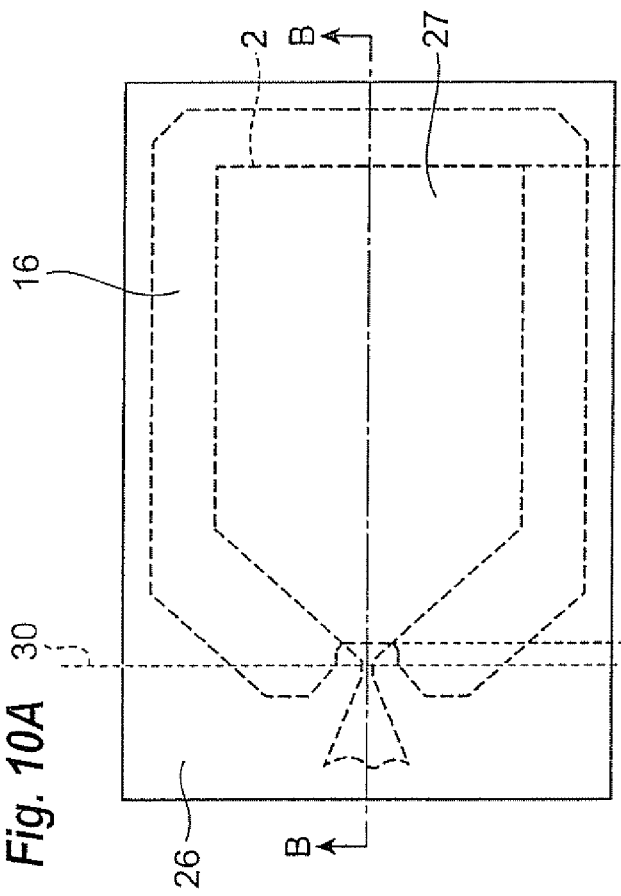
Figure 10D:
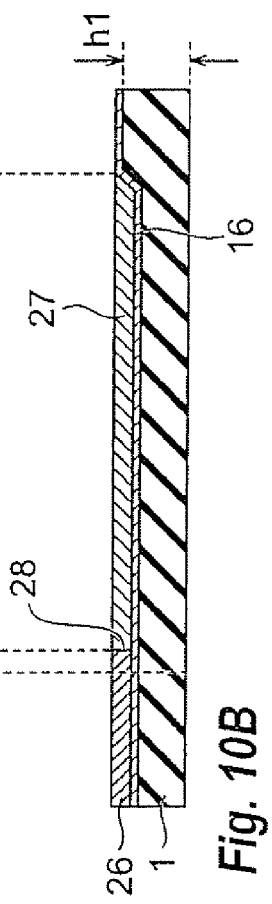

Subsequently, as shown in FIGS. 10A and 10C, the whole surface of the substrate including the surface of the magnetic layers 26 and 27 on the side closer to the thin-film coil 100 is subjected to chemical mechanical polishing (hereinafter referred to as "CMP") as a surface-flattening process. Here, the coating 16 made of Ta, W, TiN, or the like functions as a stopper, so that the height h1 from the bottom face of the insulating layer 1 to the surface of the magnetic layer 27 is regulated such that the depth d1 of the cavity 2 (see FIG. 3C) is on the order of 0.2 to 0.25 μm. Flattening this surface will later form the magnetic pole end part 11 and yoke magnetic pole part 20.

Figure 11A:
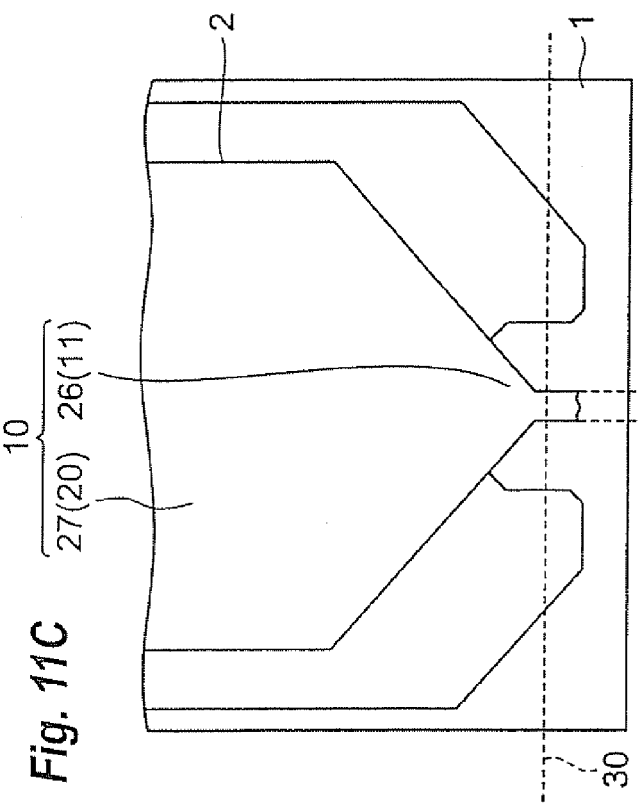
Figure 11B:
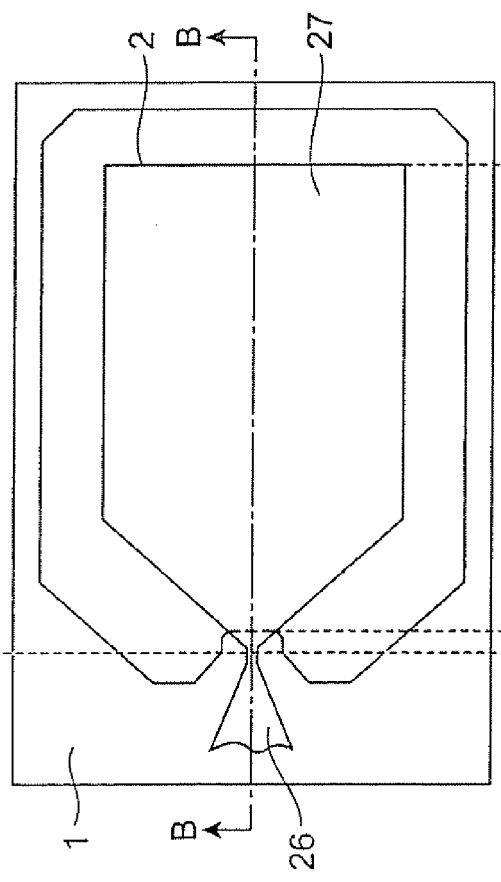
Figure 11C:
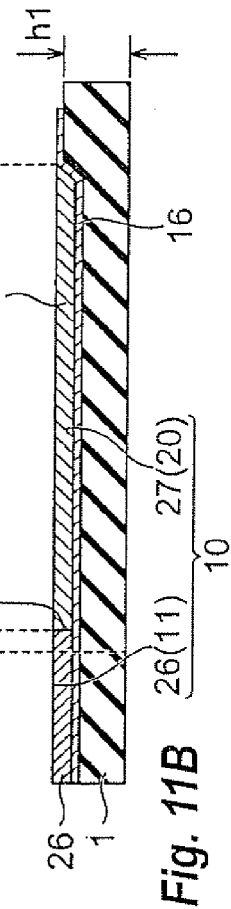
Figure 11D:
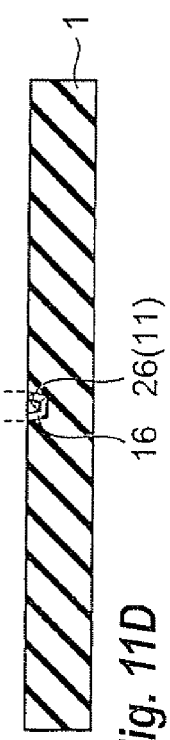

Removing the coating 16 by a method such as CMP, IBE, or RIE forms the magnetic pole end part 11 and yoke magnetic pole part 20 as shown in FIGS. 11A and 11C. Here, respective end faces of the magnetic pole end part 11 and yoke magnetic pole part extending along the ABS 30 are joined to each other in the region (variable width depression 4) other than the very narrow groove part 3 in the cavity 2. This forms a main magnetic pole layer 10 embedded in the cavity 2. A recording gap layer 24, a thin-film coil 100, a write shield layer 40, a back magnetic pole layer 51, and the like will now be formed in succession.

Figures 12A, 12B:
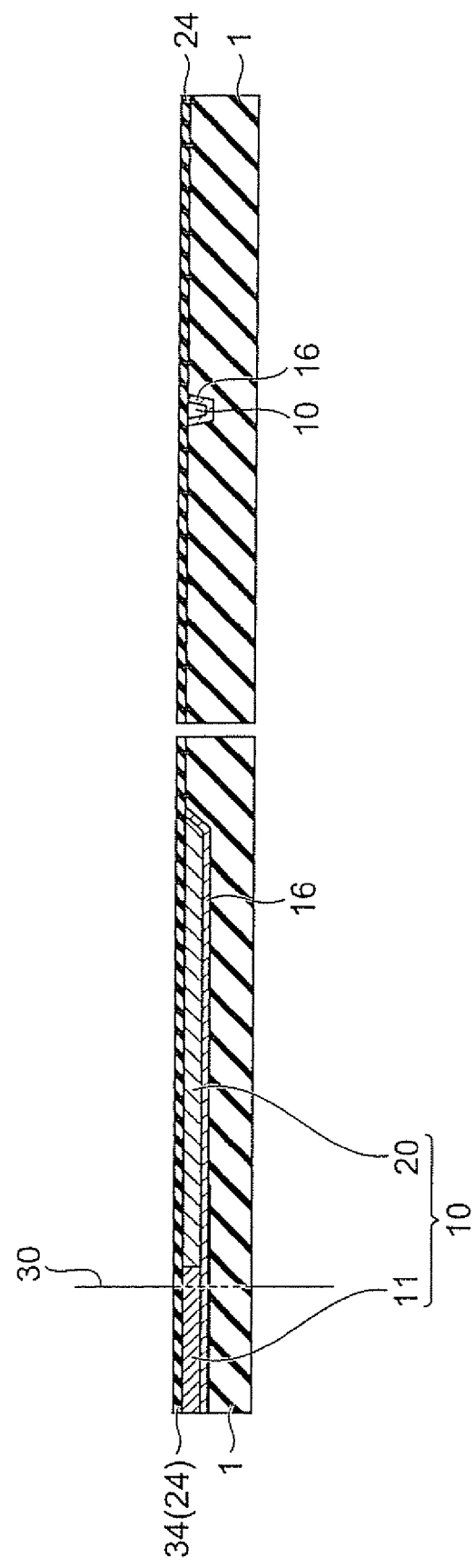

Then, as shown in FIGS. 12A and 12B, a coating 34 for forming the recording gap layer 24 is formed by a thickness of 400 to 500 Å so as to cover the whole upper face of the substrate including the magnetic pole end part 11 and yoke magnetic pole part 20. The material of the coating 34 may be either an insulating material such as alumina or a nonmagnetic metal material such as Ru, NiCu, Ta, W, Cr, $Al_2O_3$, $Si_2O_3$, or NiPd. The coating 34 will later form the recording gap layer 24.

Figures 13A, 13B:
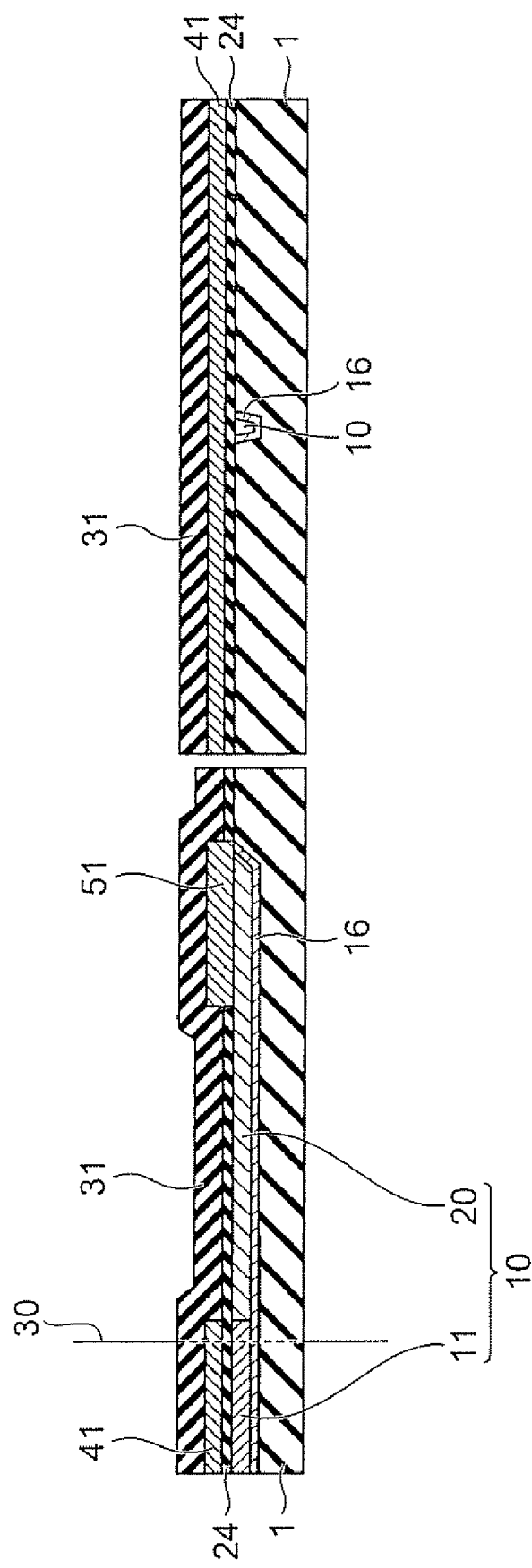

Subsequently, while opening the coating 34 in areas where a first shield part 41 and the back magnetic pole layer 51 are to be formed, the first shield part 41 and the back magnetic pole layer 51 are formed as shown in FIGS. 13A and 13B. In this case, the first shield part 41 is formed so as to oppose the magnetic pole end part 11 by way of the recording gap layer 24 in order to determine the neck height NH. The back magnetic pole layer 51 is formed so as to join with the yoke magnetic pole part 20 at a position not covered with the recording gap layer 24. It will be sufficient if the first shield part 41 and the back magnetic pole layer 51 are formed by plating with CoNiFe or NiFe as a magnetic material as with the yoke magnetic pole part 20.

Next, the insulating layer 31 made of alumina ($Al_2O_3$) is formed by a thickness of 1.0 to 1.5 μm, for example, so as to cover the whole upper face of the substrate. In order for the first shield part 41 and the yoke magnetic pole part 20 to have a thickness on the order of 0.5 to 1.0 μm, their surface is subjected to CMP as a surface-flattening process. This forms an opening in a place where a second shield part 42 is to be formed.

Figures 14A, 14B:
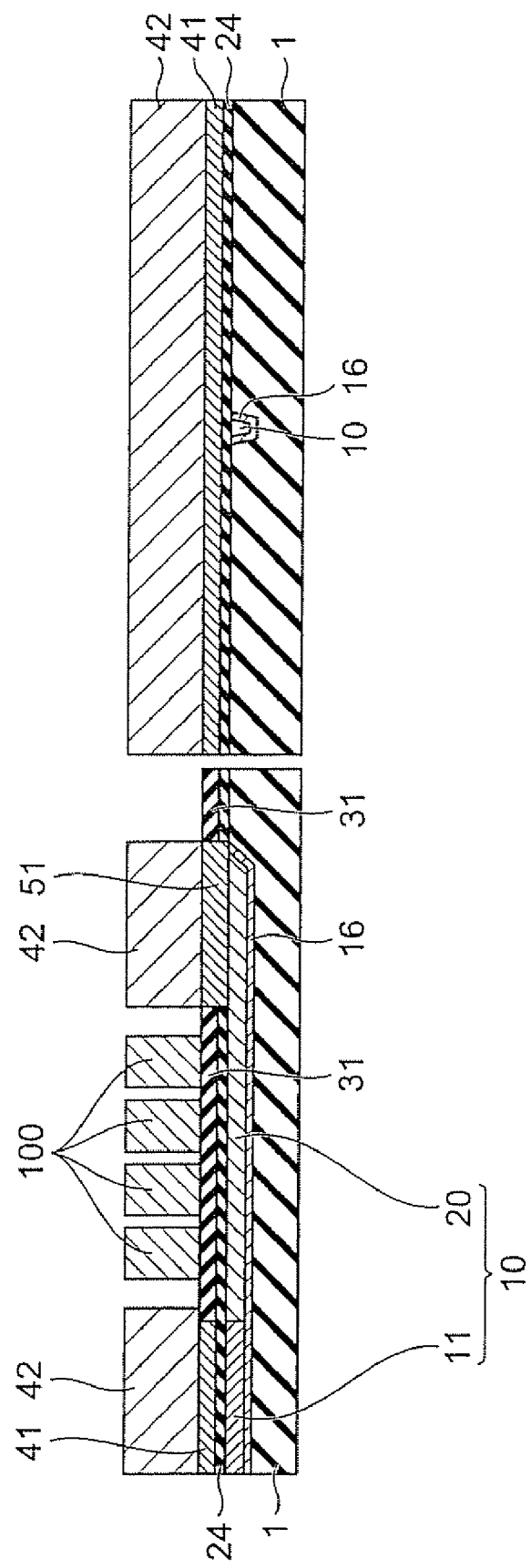

Subsequently, as shown in FIGS. 14A and 14B, an electrode film (not depicted) made of a conductive material and a frame made by photolithography are formed on the insulating layer 31, and then electroplating is performed with the electrode film, so as to form a plating layer made of Cu. This plating layer and the electrode film thereunder become a thin-film coil 100. The thin-film coil 100 is formed on the yoke magnetic pole part 20 by way of the insulating layer 31.

Next, though not depicted, a frame is formed by photolithography, and the second shield part 42 is formed by frame plating. The second shield part 42 uses the same magnetic material as with the first shield part 41. The second shield part 42 and the thin-film coil 100 may be formed in reverse order as well.

Subsequently, as shown in FIGS. 15A and 15B, a photoresist 101 is applied so as to cover the whole upper face of the substrate. Further, an insulating layer 35 made of alumina ($Al_2O_3$) is formed by a thickness of about 3.0 to 4.0 μm thereon, and then the whole surface is subjected to CMP as a surface-flattening process.

Subsequently, as shown in FIGS. 1A and 1B, an insulating layer made of alumina ($Al_2O_3$) is formed by a thickness of about 0.2 μm so as to cover the whole upper face of the substrate, and an opening is formed in the place where the second shield part 42 is formed. This yields an insulating layer 32 which insulates the thin-film coil 100 and a third shield part 43 from each other so as to prevent them from short-circuiting.

Next, the third shield part 43 is formed by a thickness of about 2 to 3 μm, whereby the write shield layer 40 is formed. The foregoing steps yield the thin-film magnetic head structure 300 shown in FIGS. 1A and 1B. Thus obtained thin-film magnetic head structure 300 has the above-mentioned configuration, thereby being capable of effectively preventing the pole erasure from occurring, while improving the recording density. When the thin-film magnetic head structure 300 is cut at the ABS 30, a thin-film magnetic head in accordance with the present invention is obtained. This thin-film magnetic head exhibits the same operations and effects as with the thin-film magnetic head structure 300.

MODIFIED EXAMPLE 1

Figures 19A, 19B:
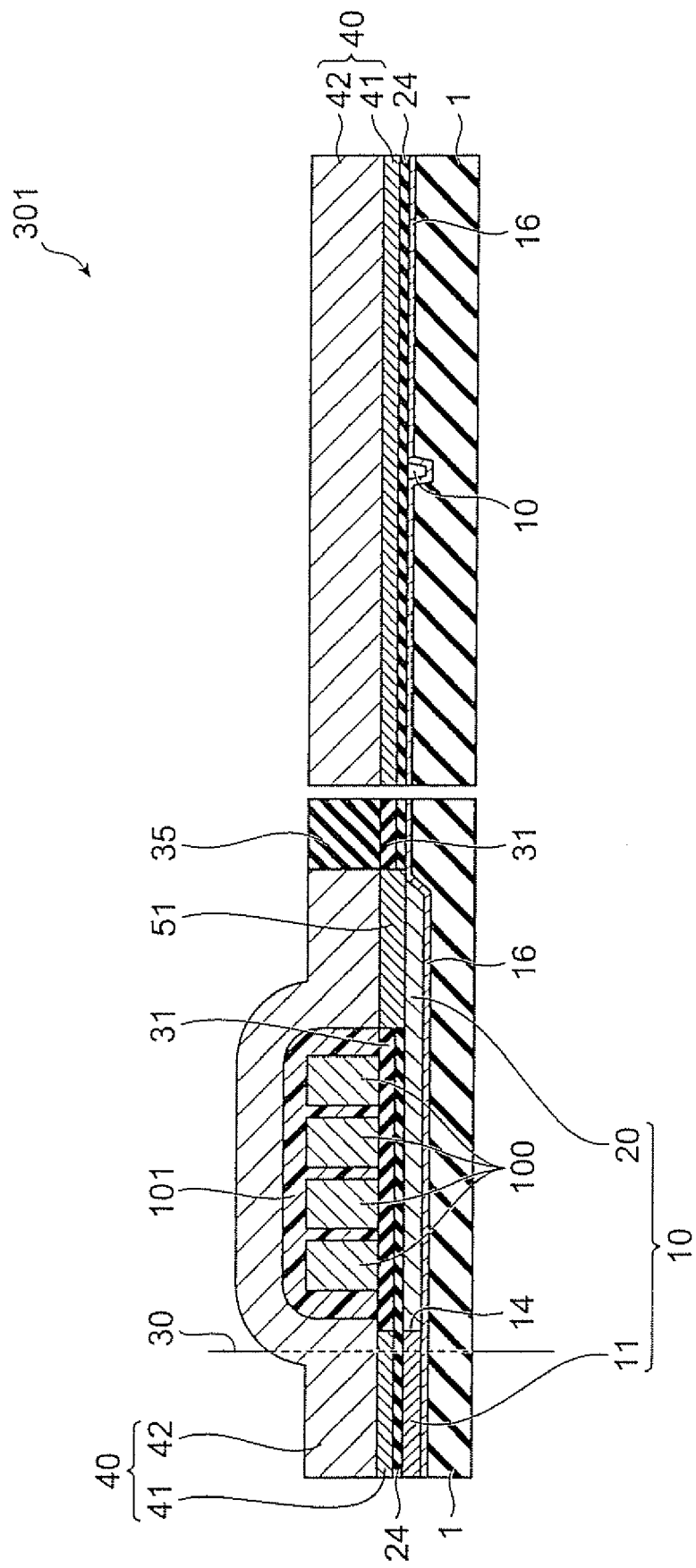

The manufacturing process mentioned above can be modified as follows. Namely, after the whole upper face of the semiconductor wafer is subjected to CMP as shown in FIGS. 13A and 13B, the thin-film coil 100 is formed by way of the insulating layer 31 earlier than the second shield part 42. Subsequently, the photoresist 101 is formed so as to cover the thin-film coil 100. Further, the second shield part 42 is formed so as to cover the thin-film coil 100 and the photoresist 101, and connect with the first shield part 41 and the back magnetic pole layer 51. This yields a thin-film magnetic head structure 301 comprising the first shield part 41 and second shield part 42 without the third shield part 43 as shown in FIGS. 19A and 19B.

This thin-film magnetic head structure 301 has the same configuration as with the thin-film magnetic head structure 300 except that it lacks the third shield part 43 and the insulating layer 32. Therefore, the thin-film magnetic head structure 301 exhibits the same operations and effects as with the thin-film magnetic head structure 300. The manufacturing process in this modified example requires no step for manufacturing the third shield part 43, and thus can become simpler than the manufacturing process of the thin-film magnetic head structure 300.

MODIFIED EXAMPLE 2

The thin-film magnetic head structure 300 can also be made without using the cavity 2. First, in this case, an end-face-equipped magnetic pole layer having an exposed end face as with the in-depression end face 16a is formed at a position where the magnetic pole end part 11 is to be formed in the insulating layer 1. Next, at a position where the yoke magnetic pole part 20 is to be formed in the insulating layer 1, a joining magnetic pole layer joined to the exposed end face of the end-face-equipped magnetic pole layer is formed. The subsequent steps are performed as mentioned above. The manufacturing method in accordance with Modified Example 2 can yield a thin-film magnetic head structure 302 without the cavity 2.

Second Embodiment

With reference to FIGS. 16A and 16B, the thin-film magnetic head structure in accordance with the second embodiment of the present invention will be explained. FIGS. 16A and 16B are sectional views of the thin-film magnetic head structure 310 in accordance with the second embodiment of the present invention, in which FIG. 16A is a sectional view taken along a direction intersecting a thin-film coil, and FIG. 16B is a sectional view showing the ABS when cut at the ABS.

Configuration of Thin-Film Magnetic Head Structure

The thin-film magnetic head structure 310 in accordance with the second embodiment is the same as the above-mentioned thin-film magnetic head structure 300 except that it includes a nonmagnetic film 61. The following explanation relates to their difference while omitting or simplifying descriptions concerning their common points.

The nonmagnetic film 61 is formed in a portion of the yoke magnetic pole part 20 other than its surface on the thin-film coil 100 side. Namely, the nonmagnetic film 61 is disposed at the interface 14 between the magnetic pole end part 11 and the yoke magnetic pole part 20, and in the part between the yoke magnetic pole part 20 and the coating 16. The nonmagnetic film 61 is made of Ru, Ta, W, Cr, or the like and has a thickness of about 10 to 30 Å. The nonmagnetic film 61 functions to control the direction of remnant magnetization mr in the magnetic pole end part 11 and yoke magnetic pole part 20 and prevent the direction of remnant magnetization mr from being oriented in a different direction. Therefore, the thin-film magnetic head structure 310 can more effectively prevent the pole erasure from occurring, while improving the recording density more than the thin-film magnetic head structure 300 does. The thin-film magnetic head structure 302 using no cavity 2 can also be provided with the nonmagnetic film 61.

Method of Manufacturing Thin-Film Magnetic Head Structure

The method of manufacturing the thin-film magnetic head structure 310 is the same as the method of manufacturing the thin-film magnetic head structure 300 except for the steps after forming the magnetic layer 26.

When manufacturing the thin-film magnetic head structure 310, the nonmagnetic film 61 is formed before forming the magnetic layer 27 after forming the magnetic layer 26. In this case, the nonmagnetic film 61 is formed so as to cover the in-depression inner end face 26a and the surface within the cavity 2.

Next, the magnetic layer 27 is formed as in the thin-film magnetic head structure 300 in the first embodiment. Then, since the nonmagnetic film 61 is formed in the portion of the yoke magnetic pole part 20 other than the surface on the thin-film coil 100 side, the exposed in-depression inner face 26a of the magnetic layer 26 and the magnetic layer 27 join with each other by way of the nonmagnetic film 61 within the cavity 2, whereby the nonmagnetic film 61 is disposed as the interface 28.

Figures 18A, 18B:
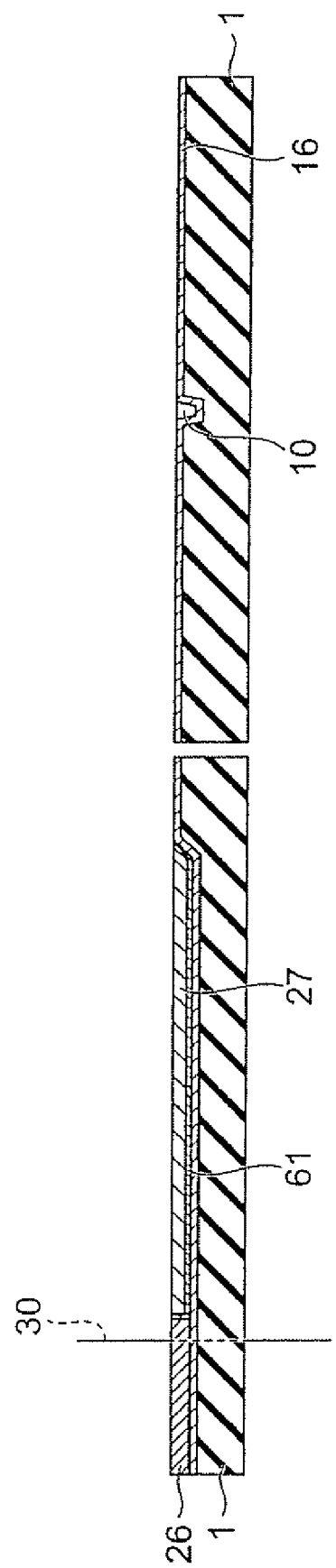

Subsequently, as in the thin-film magnetic head structure 300, an insulating layer 29 (not depicted) is formed, and the whole surface of the substrate is subjected to CMP as a surface-flattening process. This yields a state shown in FIGS. 18A and 18B. This state corresponds to FIGS. 10B and 10D. The subsequent steps are carried out as in the thin-film magnetic head structure 300 in the first embodiment, whereby the thin-film magnetic head structure 310 is obtained.

MODIFIED EXAMPLE 1

Figures 20A, 20B:
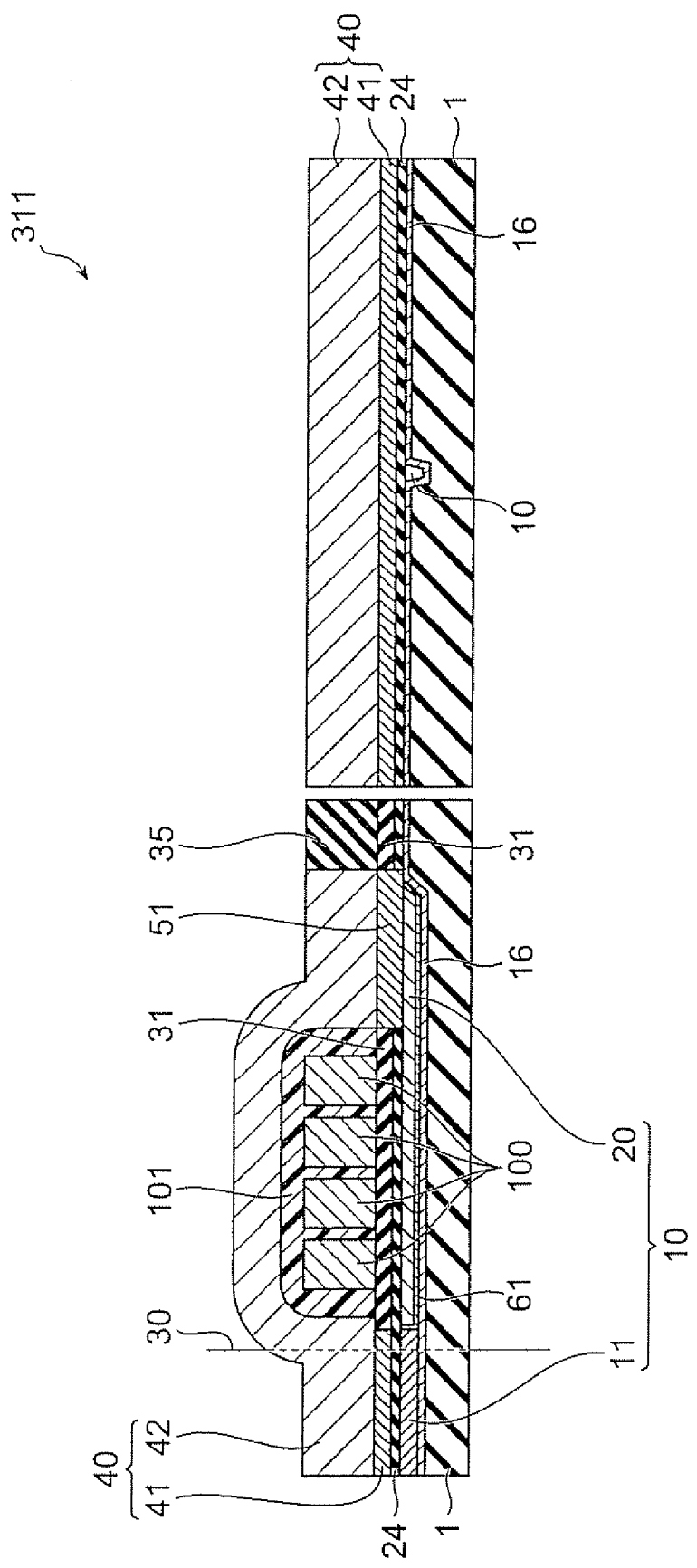

The manufacturing process mentioned above can be modified as in the first embodiment. Namely, after forming the first shield part 41 and the back magnetic pole layer 51, the whole upper face of the substrate is subjected to CMP, and then the thin-film coil 100 is formed by way of the insulating layer 31 earlier than the second shield part 42. Next, the photoresist 101 is formed so as to cover the thin-film coil 100. Further, the second shield part 42 is formed so as to cover the thin-film coil 100 and the photoresist 101, and connect with the first shield part 41 and the back magnetic pole layer 51. This yields a thin-film magnetic head structure 311 including a write shield layer 40 comprising the first shield part 41 and second shield part 42 without the third shield part 43 as shown in FIGS. 20A and 20B.

This thin-film magnetic head structure 311 has the same configuration as with the thin-film magnetic head structure 310 except that it lacks the third shield part 43 and the insulating layer 32, and exhibits the same operations and effects as with the thin-film magnetic head structure 310. The manufacturing process in this modified example requires no step for manufacturing the third shield part 43, and thus can become simpler than the manufacturing process of the thin-film magnetic head structure 310.

MODIFIED EXAMPLE 2

As with the thin-film magnetic head structure 300 in accordance with the first embodiment, the thin-film magnetic head structure 310 can also be manufactured without the cavity 2. The manufacturing method in this case is as follows. First, a nonmagnetic film similar to the nonmagnetic film 61 is formed at the exposed end face of the end-face-equipped magnetic pole layer in Modified Example 2 of the first embodiment. Next, a joining magnetic pole layer joined to the exposed end face of the end-face-equipped magnetic pole layer is formed at a position where the yoke magnetic pole part 20 is to be formed in the insulating layer. This joins the end-face-equipped magnetic pole layer and the joining magnetic pole layer to each other by way of the nonmagnetic film. The other steps are performed as in Modified Example 2 of the first embodiment.

Third Embodiment

With reference to FIGS. 21A and 21B, the thin-film magnetic head structure in accordance with the third embodiment will be explained. FIGS. 21A and 21B are sectional views of the thin-film magnetic head structure 320 in accordance with the third embodiment, in which FIG. 21A is a sectional view taken along a direction intersecting the thin-film coil, and FIG. 21B is a sectional view showing the ABS when cut at the ABS.

The thin-film magnetic head structure 320 in accordance with the third embodiment is the same as the above-mentioned thin-film magnetic head structure 300 except that it includes an upper yoke magnetic pole part 45, that it lacks the back magnetic pole layer 51, that the recording gap layer 24 and insulating layer 31 have different forms, and that it includes an insulating layer 33. The following explanation relates to their difference while omitting or simplifying descriptions concerning their common points.

The thin-film magnetic head structure 320 includes the upper yoke magnetic pole part 45, which is joined to the surface of the yoke magnetic pole part 20 on the side closer to the thin-film coil 100 at a position distant from the ABS 30 than the recording gap layer 24. The upper yoke magnetic pole part 45 is formed together with the first shield part 41 when the first shield part 41 is formed by plating.

Joining the upper yoke magnetic pole part 45 to the yoke magnetic pole part 20 can increase the quantity of magnetization of the main magnetic pole layer 10 in the vicinity of the ABS 30. Therefore, the thin-film magnetic head structure 320 can manufacture a thin-film magnetic head having a favorable overwrite characteristic.

When manufacturing the thin-film magnetic head structure 320, it will be sufficient if a step of joining the upper yoke magnetic pole part 45 to a part distant from the ABS 30 than the recording gap layer 24 in the yoke magnetic pole part 20 is provided. In this case, the thin-film magnetic head structure 320 can be manufactured either with or without the cavity 2.

Figures 22A, 22B:
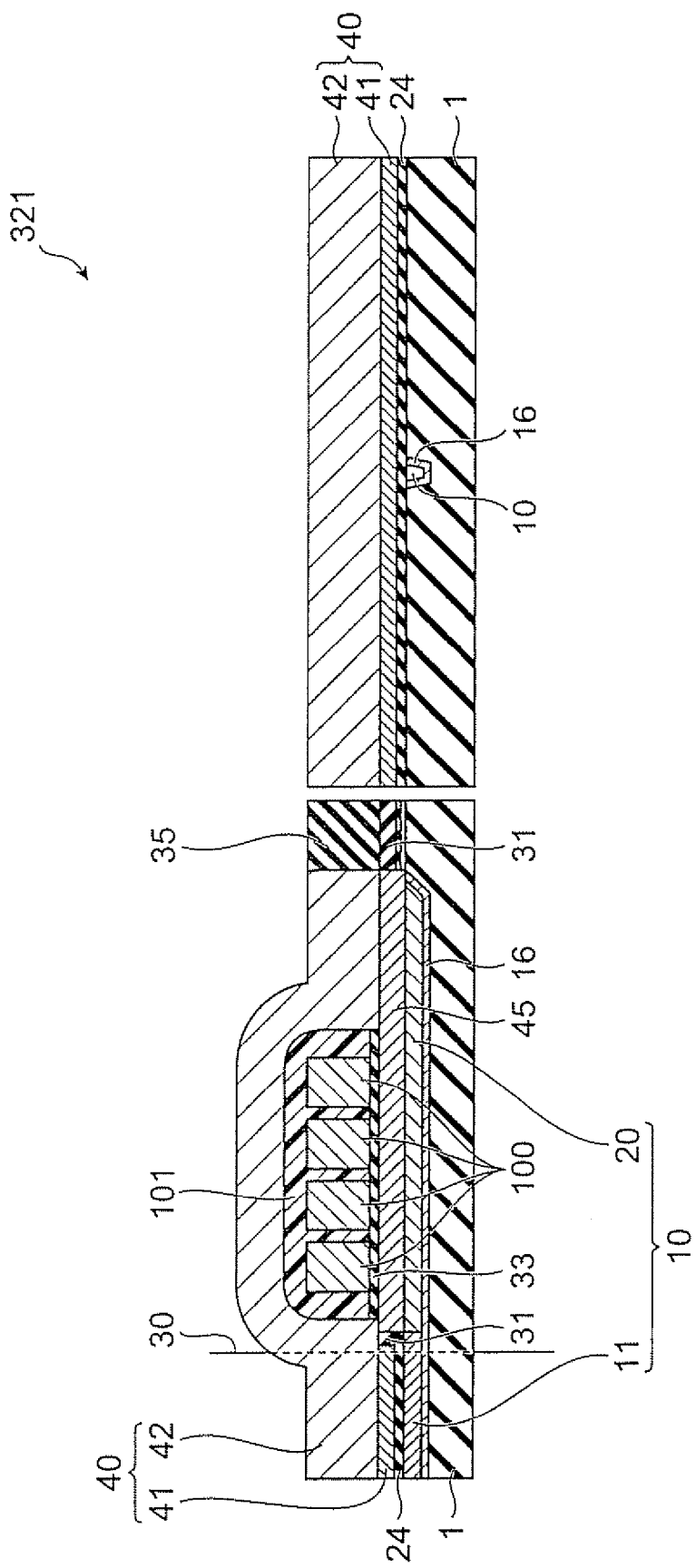

As with the thin-film magnetic head structure 300 in accordance with the first embodiment, the thin-film magnetic head structure 320 can be made as a thin-film magnetic head structure 321 shown in FIGS. 22A and 22B. This thin-film magnetic head structure 321 includes a write shield layer 40 comprising the first shield part 41 and second shield part 42 without the third shield part 43.

Though not depicted, the nonmagnetic film 61 may be formed in the portion where the magnetic pole end part 11 and the yoke magnetic pole part 20 are joined to each other and in the portion between the yoke magnetic pole part 20 and the coating 16 in any of the thin-film magnetic head structures 320 and 321.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated;
    wherein the main magnetic pole layer has an end face joint structure where respective end faces of the magnetic pole end part and a yoke magnetic pole part having a size greater than that of the magnetic pole end part are joined to each other, and a surface with a flat structure on a side closer to the thin-film coil and wherein entire layer of the main magnetic pole layer is flat;
    wherein the thin-film coil is laminated adjacent to and in contact with an upper side of an insulating layer, wherein the insulating layer is laminated adjacent to and in contact with an upper side of the main magnetic pole layer.

2. A thin-film magnetic head structure according to claim 1, further comprising a base insulating layer including a magnetic pole forming depression sunken into a form corresponding to the main magnetic pole layer, the magnetic pole forming depression having a very narrow groove part formed so as to define a track width of the thin-film magnetic head;
    wherein the respective end faces of the magnetic pole end part and yoke magnetic pole part are joined to each other within a region other than the very narrow groove part in the magnetic pole forming depression of the base insulating layer.

3. A thin-film magnetic head structure according to claim 2, wherein the magnetic pole end part and the yoke magnetic pole part are formed from respective magnetic materials having saturated magnetic flux densities different from each other.

4. A thin-film magnetic head structure according to claim 3, wherein the saturated magnetic flux density of the magnetic pole end part is set higher than the saturated magnetic flux density of the yoke magnetic pole part.

5. A thin-film magnetic head structure according to claim 2, wherein the magnetic pole end part and the yoke magnetic pole part are joined to each other by way of a nonmagnetic film made of a nonmagnetic material.

6. A thin-film magnetic head structure according to claim 2, wherein an upper yoke magnetic pole part having a size greater than that of the magnetic pole end part is joined to a portion of the yoke magnetic pole part distant from the medium-opposing surface than is the recording gap layer.

7. A thin-film magnetic head structure according to claim 2, wherein the very narrow groove part is formed such that a groove width intersecting the length thereof gradually decreases along the depth thereof.

8. A thin-film magnetic head structure according to claim 1, wherein the magnetic pole end part and the yoke magnetic pole part are formed from respective magnetic materials having saturated magnetic flux densities different from each other.

9. A thin-film magnetic head structure according to claim 3, wherein the saturated magnetic flux density of the magnetic pole end part is set higher than the saturated magnetic flux density of the yoke magnetic pole part.

10. A thin-film magnetic head structure according to claim 1, wherein the magnetic pole end part and the yoke magnetic pole part are joined to each other by way of a nonmagnetic film made of a nonmagnetic material.

11. A thin-film magnetic head structure according to claim 1, wherein an upper yoke magnetic pole part having a size greater than that of the magnetic pole end part is joined to a portion of the yoke magnetic pole part distant from the medium-opposing surface than the recording gap layer.

12. A thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated and wherein entire layer of the main magnetic pole layer is flat;
    the thin-film magnetic head comprising:
        a base insulating layer including a coating and a magnetic pole forming depression sunken into a form corresponding to the main magnetic pole layers, the magnetic pole forming depression having a very narrow groove part formed so as to define a track width of the thin-film magnetic head;
        wherein the main magnetic pole layer has an end face joint structure where respective end faces of the magnetic pole end part and a yoke magnetic pole part having a size greater than that of the magnetic pole end part are joined to each other, and a surface with a flat structure on a side closer to the thin-film coil;
    wherein the thin-film coil is laminated adjacent to and in contact with an upper side of an insulating layer, wherein the insulating layer is laminated adjacent to and in contact with an upper side of the main magnetic pole layer.

* * * * *